United States Patent
Nagashima et al.

(10) Patent No.: US 9,284,464 B2
(45) Date of Patent: Mar. 15, 2016

(54) INKJET INK, INK CARTRIDGE, AND INKJET RECORDING DEVICE

(71) Applicants: Hidefumi Nagashima, Kanagawa (JP); Naohiro Toda, Kanagawa (JP); Tomohiro Nakagawa, Kanagawa (JP); Juichi Furukawa, Kanagawa (JP); Ichiroh Fujii, Kanagawa (JP)

(72) Inventors: Hidefumi Nagashima, Kanagawa (JP); Naohiro Toda, Kanagawa (JP); Tomohiro Nakagawa, Kanagawa (JP); Juichi Furukawa, Kanagawa (JP); Ichiroh Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/541,396

(22) Filed: Nov. 14, 2014

(65) Prior Publication Data
US 2015/0138284 A1    May 21, 2015

(30) Foreign Application Priority Data

| Nov. 19, 2013 | (JP) | 2013-238755 |
| May 28, 2014 | (JP) | 2014-109635 |
| Oct. 20, 2014 | (JP) | 2014-213549 |

(51) Int. Cl.
| *G01D 1/00* | (2006.01) |
| *B41J 2/17* | (2006.01) |
| *C09D 11/38* | (2014.01) |
| *C09D 11/322* | (2014.01) |
| *C09D 11/36* | (2014.01) |
| *C09D 175/04* | (2006.01) |
| *C08K 5/098* | (2006.01) |
| *C08K 5/42* | (2006.01) |
| *C08G 18/66* | (2006.01) |
| *C08G 18/75* | (2006.01) |
| *C08G 18/08* | (2006.01) |
| *C09D 175/06* | (2006.01) |
| *C08G 18/44* | (2006.01) |
| *C09D 11/102* | (2014.01) |

(Continued)

(52) U.S. Cl.
CPC ........... *C09D 11/38* (2013.01); *C08G 18/0823* (2013.01); *C08G 18/44* (2013.01); *C08G 18/6625* (2013.01); *C08G 18/758* (2013.01); *C08K 5/098* (2013.01); *C08K 5/3492* (2013.01); *C08K 5/42* (2013.01); *C09D 11/102* (2013.01); *C09D 11/322* (2013.01); *C09D 11/36* (2013.01); *C09D 175/04* (2013.01); *C09D 175/06* (2013.01); *C08K 5/3435* (2013.01); *C08K 5/3475* (2013.01); *C08K 5/34926* (2013.01)

(58) Field of Classification Search
USPC .......................... 347/88, 95, 96, 98, 99, 100
See application file for complete search history.

(56) References Cited

U.S. PATENT DOCUMENTS

| 5,514,209 A * | 5/1996 | Larson, Jr. ................... 106/31.3 |
| 6,972,303 B1 | 12/2005 | Miyabayashi et al. |

(Continued)

FOREIGN PATENT DOCUMENTS

| JP | 3446213 | 7/2003 |
| JP | 2005-220352 | 8/2005 |

(Continued)

OTHER PUBLICATIONS

U.S. Appl. No. 14/320,859, filed Jul. 1, 2014.

(Continued)

*Primary Examiner* — Anh T. N. Vo
(74) *Attorney, Agent, or Firm* — Cooper & Dunham LLP

(57) ABSTRACT

An inkjet ink including: water; a water-soluble organic solvent; a pigment; polycarbonate modified urethane resin particles; an ultraviolet absorber; and a light stabilizer.

12 Claims, 6 Drawing Sheets

(51) Int. Cl.
　　 *C08K 5/3475* (2006.01)
　　 *C08K 5/3492* (2006.01)
　　 *C08K 5/3435* (2006.01)

(56) References Cited

U.S. PATENT DOCUMENTS

| | | | |
|---|---|---|---|
| 7,569,160 B2* | 8/2009 | Oldenzijl et al. | 252/500 |
| 8,240,836 B2* | 8/2012 | Morohoshi et al. | 347/100 |
| 8,814,340 B2* | 8/2014 | Goto | 347/100 |
| 2005/0176847 A1 | 8/2005 | Cagle | |
| 2009/0123675 A1 | 5/2009 | Shaw-Klein et al. | |
| 2012/0188305 A1* | 7/2012 | Shiono | 347/20 |
| 2012/0293582 A1 | 11/2012 | Goto et al. | |
| 2012/0308785 A1 | 12/2012 | Nakagawa | |
| 2012/0320133 A1 | 12/2012 | Namba et al. | |
| 2012/0328853 A1 | 12/2012 | Matsuyama et al. | |
| 2013/0002776 A1 | 1/2013 | Nagashima et al. | |
| 2013/0023614 A1 | 1/2013 | Hatada et al. | |
| 2013/0066006 A1* | 3/2013 | Miyajima | 524/497 |
| 2013/0113860 A1 | 5/2013 | Gotou et al. | |
| 2013/0194345 A1 | 8/2013 | Tamai et al. | |
| 2013/0197144 A1 | 8/2013 | Katoh et al. | |
| 2013/0271524 A1 | 10/2013 | Katoh et al. | |
| 2013/0344470 A1 | 12/2013 | Morgan et al. | |
| 2014/0002539 A1 | 1/2014 | Goto et al. | |
| 2014/0192112 A1 | 7/2014 | Nagashima et al. | |
| 2014/0267520 A1 | 9/2014 | Toda et al. | |

FOREIGN PATENT DOCUMENTS

| | | |
|---|---|---|
| JP | 2039-132766 | 6/2009 |
| JP | 2010-168480 | 8/2010 |
| JP | 2011-502824 | 1/2011 |
| JP | 2011-094082 | 5/2011 |
| JP | 2013-076018 | 4/2013 |
| JP | 2013-124333 | 6/2013 |
| JP | 2013-194150 | 9/2013 |

OTHER PUBLICATIONS

U.S. Appl. No. 14/207,868, filed Jun. 6, 2014.

* cited by examiner

INKJET INK, INK CARTRIDGE, AND INKJET RECORDING DEVICE

BACKGROUND OF THE INVENTION

1. Field of the Invention

The present invention relates to an inkjet ink, an ink cartridge, and an inkjet recording device.

2. Description of the Related Art

Inkjet printers have advantages such as low noise, low running cost, and easiness of color printing, and thus have widely been used in ordinary homes as output devices of digital signals. In recent years, inkjet technologies have been utilized not only for home use but also for industrial applications such as displays, posters, and signboards. In such applications, porous media have problems with their durability such as light resistance, waterproofness, and wear resistance. Therefore, non-porous recording media such as plastic films have been used, and inks for them have been developed.

Such an inkjet ink (hereinafter may be referred to as "ink") which has widely been used so far includes a solvent-based inkjet ink using an organic solvent as a vehicle, and an ultraviolet ray-curable inkjet ink containing a polymerizable monomer as a main ingredient.

The above solvent-based inkjet ink, however, gives off a large amount of solvent into air as a result of evaporation, which is not preferable from the viewpoint of environmental load. The ultraviolet ray-curable inkjet ink may be sensitive to the skin depending on the monomers used. In addition, use of the ultraviolet ray-curable inkjet ink requires incorporation of an expensive ultraviolet ray irradiation device into a printer main body, which limits its applicable fields.

Under such circumstances, developments have recently been made on aqueous inkjet recording inks which have low environmental load and have been used as inkjet inks for home use but which can directly print on non-porous base materials (see Japanese Patent Application Laid-Open (JP-A) Nos. 2005-220352 and 2011-94082).

However, several have been pointed out about the fact that these aqueous inks are inferior to solvent-based inkjet inks in terms of image quality.

First, an ink does not basically penetrate a non-porous base material and an ink on the base material has to be immediately dried. However, aqueous inks have downsides that their drying property is degraded due to water itself serving as a primary solvent of them and a water-soluble organic solvent added as an additive to easily cause drying failure. Therefore, when resultant printed matters are stacked on top of one another or rolled up, offset of the ink, so-called blocking, may disadvantageously occur.

Also, many non-porous base materials have very high gloss, and thus inks capable of providing high gloss have been required in order to ensure a sense of unity as a recorded matter between a printed portion and a non-printed portion formed after printing. In aqueous inks unlike solvent-based inks in which resins dissolves in inks, particles are fused to form a coating film and hence it is easier for the surface to be roughened to lead to degradation of its gloss. In addition, as for image robustness, satisfactory properties about scratch resistance, ethanol resistance, and light resistance have not yet been achieved, and higher performances have been required at present.

In particular, in outdoor applications such as advertisements and signboards among the aforementioned industrial applications, for example, high image robustness capable of passing JIS D0205 "Test Method of Weatherability for Automotive Parts" has been required at present.

As a measure to improve light resistance of an ink, an inkjet ink has been proposed in which a colorant is included in a polymer having in its molecular chain a moiety with ultraviolet absorbing property or light stabilizing property (see Japanese Patent (JP-B) No. 3446213).

This proposed ink, however, has a problem that it is degraded in drying property when used for non-porous recording media such as a plastic film, to thereby easily cause drying failure.

As a measure to improve scratch resistance of a printed matter obtained by applying an ink on a non-absorptive base material, an inkjet ink has been proposed which contains a polycarbonate group-containing polyurethane resin as a pigment dispersing agent in order to exhibit good storage stability (see Japanese Patent Application Laid-Open (JP-A) No. 2013-76018).

This proposal, however, uses the pigment dispersing agent as a resin for satisfying image robustness, especially scratch resistance, and an amount of the pigment dispersing agent added is also small, and as a result desired scratch resistance cannot be obtained. Note that, this proposal has descriptions that an ultraviolet absorber and a light stabilizer are used; however, they are not actually used in the Examples.

Under such circumstances, demand has arisen for provision of an inkjet ink that exhibits good drying property and provides a printed portion having a high level of gloss and being excellent in scratch resistance, ethanol resistance, offset resistance and light resistance when it is used for printing on a non-porous base material.

SUMMARY OF THE INVENTION

The present invention aims to provide an inkjet ink that exhibits good drying property and provides a printed portion having a high level of gloss and being excellent in scratch resistance, ethanol resistance, blocking resistance and light resistance when it is used for printing on a non-porous base material.

An inkjet ink of the present invention as a means for solving the above problem includes water; a water-soluble organic solvent; a pigment; polycarbonate-modified urethane resin particles; an ultraviolet absorber; and a light stabilizer.

The present invention can provide an inkjet ink that exhibits good drying property and provides a printed portion having a high level of gloss and being excellent in scratch resistance, ethanol resistance, blocking resistance and light resistance when it is used for printing on a non-porous base material, the inkjet ink being able to solve the above various existing problems and achieve the above object.

Figure 1:
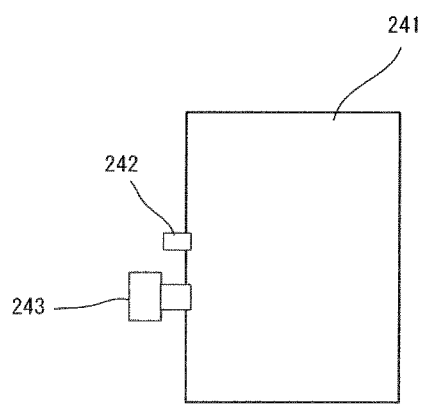
FIG. 1 is a schematic diagram illustrating one example of an ink cartridge.

DETAILED DESCRIPTION OF THE INVENTION (Inkjet Ink)

An inkjet ink of the present invention includes water, a water-soluble organic solvent, a pigment, polycarbonate-modified urethane resin particles, an ultraviolet absorber, and a light stabilizer; preferably includes a polyethylene wax and a levelling agent; and, if necessary, further includes other ingredients.

The present inventors conducted extensive studies to solve the above problems and as a result have found that it is necessary to add an organic solvent having a relatively low boiling temperature to achieve drying property intended by the present invention since a water-soluble organic solvent to be added to an aqueous ink generally has a higher boiling point than water and is hardly dried.

However, when quick-drying property is required for an ink, film formation of a resin is generally too fast to form a sufficiently uniform coating film, which problematically degrades film strength and glossiness thereof.

In view of this, the present inventors conducted extensive studies on the relationship between a resin present and a water-soluble organic solvent, use of a polycarbonate-modified urethane resin and a water-soluble organic solvent having a boiling point of 220° C. or lower enables formation of a uniform film.

In particular, a polycarbonate-modified urethane resin is excellent in waterproofness, heat resistance, wear resistance, and light resistance by virtue of high aggregation power of carbonate groups thereof, and is suitable for use in formation of printed matters used under severe environments such as outdoor applications. It is believed that after a specific water-soluble organic solvent is printed as an ink together with emulsion particles of a polycarbonate-modified urethane resin, promoting proper drying property and fusion of resin emulsion particles enables formation of a uniform film, so that a printed portion can have high gloss and further exhibit scratch resistance and ethanol resistance.

In addition, it has been found that the inkjet ink of the present invention is improved in adhesive property through heating treatment since the residual solvent is reduced, and also can favorably use polycarbonate-modified urethane resin particles since they have high heat resistance.

The water-soluble organic solvent is preferably at least one selected from the group consisting of 1,2-propanediol, 1,3-propanediol, 1,2-butanediol, 1,3-butanediol, and 2,3-butanediol, which are effective to obtain higher gloss.

Inkjet inks using pigments having high image robustness as a colorant were often used for indoor applications, mainly in offices, for printing on mainly plain paper to obtain documents and recorded matters capable of being stored for a long period of times. However, these inkjet inks have yet to reach a high level of image robustness, especially light resistance, capable of passing JIS D0205 "Test Method of Weatherability for Automotive Parts", which is required for the aforementioned outdoor applications such as advertisements and signboards.

Then, the present inventors studied the relationship between an inkjet ink and light resistance and as a result have found that using an ultraviolet absorber and a light stabilizer in combination enables high light resistance intended in the present invention.

The present invention has been made based on the finding that the above problems can be solved by an inkjet ink containing at least water, a water-soluble organic solvent, a pigment, polycarbonate-modified urethane resin particles, an ultraviolet absorber, and a light stabilizer.

<Polycarbonate-Modified Urethane Resin Particles>

The polycarbonate-modified urethane resin, as used herein, refers to a reaction product of polycarbonate polyol and polyisocyanate.

As the polycarbonate polyol, for example, those obtained through an ester exchange reaction between ester carbonate and polyol in the presence of a catalyst or those obtained through a reaction between phosgene and bisphenol A can be used.

Examples of the carbonate ester include methyl carbonate, dimethyl carbonate, ethyl carbonate, diethyl carbonate, cyclocarbonate, or diphenyl carbonate.

Examples of the polyol to be react with the carbonate ester include low molecular diol compounds such as ethylene glycol, diethylene glycol, propylene glycol (1,2-propanediol), dipropylene glycol, 1,4-butanediol, 1,5-pentanediol, 3-methyl-1,5-pentanediol, neopentyl glycol, and 1,4-cyclohexanediol; polyethylene glycol; or polypropylene glycol.

The polyisocyanate is not particularly limited and may be selected appropriately depending on the intended purpose. Examples thereof include aromatic polyisocyanate compounds such as 1,3-phenylene diisocyanate, 1,4-phenylene diisocyanate, 2,4-tolylene diisocyanate (TDI), 2,6-tolylene diisocyanate, 4,4'-diphenylenemethane diisocyanate (MDI), 2,4-diphenylmethane diisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, m-isocyanatophenylsulfonyl isocyanate, and p-isocyanatophenylsulfonyl isocyanate; aliphatic polyisocyanate compounds such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl)fumarate, bis(2-isocyanatoethyl)carbonate and 2-isocyanatoethyl-2,6-diisocyanatohexanoate; isophorone diisocyanate (IPDI), 4,4'-dicyclohexylmethane diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5-norbornane diisocyanate and 2,6-norbornane diisocyanate. These may be used alone or in combination.

Among them, aliphatic or alicyclic diisocyanates are preferably used since outdoor uses such as a poster or a signage is intended and a coating film having highly excellent light resistance and weather resistance is necessary for use.

In the present invention, at least one alicyclic diisocyanate is preferably added to an ink on the present invention. Among them, isophorone diisocyanate and dicyclohexylmethane diisocyanate are preferable. The amount of the alicyclic diisocyanate is preferably 60% or more relative to the total amount of isocyanate compounds.

The polycarbonate-modified urethane resin particles are added to the ink in the form of resin emulsion where the polycarbonate-modified urethane resin particles are dispersed into an aqueous medium. The amount of solid content of resin in the resin emulsion is preferably 20% by mass or more. The content thereof is preferably 20% by mass or more from the viewpoint of designing the formulation of an ink to be prepared (the amount of materials configuring each of the inks, changing the rate of component, improvement of margin at the time of adjustment).

At this time, the average particle diameter of the polycarbonate-modified urethane resin particle is preferably from 10 nm to 350 nm from the viewpoints of liquid storage stability and ejection stability of the resulting ink.

Upon dispersing the polycarbonate-modified urethane resin particles into an aqueous medium, forced emulsification utilizing a dispersing agent may be used. In the case of forced emulsification, however, the dispersing agent may remain on a coating film to thereby decrease strength thereof. Therefore, self-emulsifying polycarbonate-modified urethane resin particles which have anionic groups in their molecular structure may be suitably used.

In the case where the self-emulsifying polycarbonate-modified urethane resin particles are used, it is preferable that the anionic groups are contained so that the acid value thereof is 20 mg KOH/g to 100 mg KOH/g, from the viewpoints of imparting excellent scratch resistance and chemical resistance.

As for the anionic groups, a carboxyl group, a carboxylate group, a sulfonic group, and a sulfonate group can be used. Among them, a carboxylate group and a sulfonate group partially or totally neutralized with for example, a basic compound are be preferably used from the viewpoint of maintaining good water-dispersion stability.

Examples of the basic compound which can be used for neutralizing the anionic group include organic amines such as ammonia, triethyl amine, pyridine, and morpholine; alkanol amines such as monoethanolamine; and metallic base compounds containing Na, K, Li, or Ca.

In the case where a method of forced emulsification is used, any of a nonionic surfactant and an anionic surfactant may be used as the dispersing agent. However, the nonionic surfactant is preferable from the viewpoint of good water resistance.

Examples of the nonionic surfactant include polyoxyethylene alkyl ether, polyoxyethylene alkylene alkyl ether, polyoxyethylene derivative, polyoxyethylene fatty acid ester, polyoxyethylene polyhydric alcohol fatty acid ester, polyoxyethylene propylene polyol, polyoxyethylene sorbitan fatty acid ester, polyoxyethylene hydrogenated castor oil, polyoxyalkylene polycyclic phenyl ether, polyoxyethylene alkylamine, alkylalkanolamide, and polyalkylene glycol (meth)acrylate. Among them, preferable are polyoxyethylene alkylether, polyoxyethylene fatty acid ester, polyoxyethylene sorbitan fatty acid ester, and polyoxyethylene alkylamine.

Examples of the anionic surfactant include alkyl sulfuric acid ester salt, polyoxyethylene alkylether sulfate, alkyl benzene sulfonate, α-olefin sulfonate, methyl taurate, sulfosuccinate, ether sulfonate, ether carbonate, fatty acid salt, naphthalene sulfonate formalin condensate, alkyl amine salt, quaternary ammonium salt, alkyl betaine, and alkyl amine oxide.

Among them, preferable are polyoxyethylene alkylether sulfate and sulfosuccinate.

An amount of the surfactant is, relative to the amount of the polycarbonate-modified urethane resin particles, preferably from 0.1% by mass to 30% by mass, more preferably from 5% by mass to 30% by mass.

The amount of the surfactant falling within the range of 0.1% by mass to 30% by mass is preferable since film forming property of the resin emulsion is not inhibited from the surfactant, leading to the resulting ink having excellent adherability and water resistance and blocking of printing matter is difficult to cause.

The urethane resin emulsion may contain, for example, a water-soluble organic solvent, an antiseptic agent, a leveling agent, an antioxidant, a light stabilizer, and an ultraviolet absorber, if necessary.

A production method of the polycarbonate-modified urethane resin particles is not particularly limited and all of the conventional methods that have been generally used may be employed.

At first, in the absence of a solvent or the presence of an organic solvent, the polycarbonate polyol is allowed to react with the polyisocyanate in an equivalent ratio so that isocyanate groups are excessively present, to thereby produce an isocyanate-terminated urethane prepolymer.

Then, anionic groups in the isocyanate-terminated urethane prepolymer are optionally neutralized with the neutralizing agent, allowed to react with a chain extender, and, finally, if necessary, remove the organic solvent in a system to thereby obtain the polycarbonate-modified urethane resin particles. As a result, polycarbonate-modified urethane resin particles can be obtained.

At this time, examples of usable organic solvent include ketones such as acetone and methyl ethyl ketone; ethers such as tetrahydrofuran and dioxane; ester acetates such as ethyl acetate and butyl acetate; nitriles such as acetonitrile; and amides such as dimethyl formamide, N-methylpyrrolidone, and 1-ethyl-2-pyrrolidone. These may be used alone or in combination.

As the chain extender, polyamines or other active hydrogen atom-containing compounds can be used.

Examples of the polyamines include diamines such as ethylene diamine, 1,2-propane diamine, 1,6-hexamethylene diamine, piperazine, 2,5-dimethyl piperazine, isophorone diamine, 4,4'-dicyclohexylmethane diamine, and 1,4-cyclohexane diamine; polyamines such as diethylene triamine, dipropylene triamine and triethylene tetramine; hydrazines such as hydrazine, N,N-dimethyl hydrazine, 1,6-hexamethylene bishydrazine; dihydrazides such as succinic dihydrazide, adipic dihydrazide, glutaric dihydrazide, sebacic dihydrazide and isophthalic dihydrazide. These may be used alone or combination.

Examples of the other active hydrogen atom-containing compounds include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerol and sorbitol; phenols such as bisphenol A, 4,4'-dihydroxy diphenyl, 4,4'-dihydroxydiphenyl ether, 4,4'-dihydroxydiphenyl sulfone, hydrogenated bisphenol A, and hydroquinone; and water. These may be used alone or in combination.

An ink jet ink of the present invention can be favorably used since a residual solvent is reduced through heating treatment, leading to improving adhesiveness and the polycarbonate-modified urethane resin particles in the ink have high heat resistance.

The minimum film forming temperature of the polycarbonate-modified urethane resin particles may not be necessarily a temperature equal to or lower than room temperature. However, in the case where the heat-drying is performed after printing, the minimum film forming temperature thereof is preferably at least a temperature equal to or lower than a temperature at which the ink is heated after printing.

The minimum film forming temperature of the polycarbonate-modified urethane resin emulsion, in which the polycarbonate-modified urethane resin particles are contained in water or water and an solvent, is preferably 0° C. or greater but lower than a heating temperature by 5° C. or greater, more preferably, 25° C. or greater but lower than a heating temperature by 10° C. or greater.

In general, the lower minimum film forming temperature is, the better a film forming property is. However, when the minimum film forming temperature is too low, the glass transition temperature of the resin is also lowered, leading to unsatisfactory coating film strength.

Note that, the minimum film forming temperature refers to a minimum temperature at which a continuous transparent film is formed when the so polycarbonate-modified urethane resin emulsion is thinly casted onto a metal plate such as aluminum, followed by heating. In a temperature range which is lower than the minimum film forming temperature, the polycarbonate-modified urethane resin emulsion is in the form of liquid or white powder.

A surface hardness of the polycarbonate-modified urethane resin particles is preferably 100 N/mm$^2$ or more. The surface hardness filling within the above-described range allows the ink to form a tough coating film, leading to higher scratch resistance.

The surface hardness can be measured as follows.

Polycarbonate-modified urethane resin emulsion is applied onto a glass slide so as to have a film thickness of 10 μm, followed by drying at 100° C. for 30 min to thereby form a resin film. The resultant resin film is measured for an indentation depth at the time when a Vickers indenter is indented with a load of 9.8 mN by means of a micro surface hardness meter (FISCHERSCOPE HM2000, product of Fischer Instruments K.K.), and converted into a Martens hardness according to ISO14577-2002.

Relative to the total amount of the inkjet ink on a solid content basis, an amount of the polycarbonate-modified urethane resin particles is preferably 0.5% by mass to 10% by mass, more preferably 1% by mass to 8% by mass, and further more preferably 3% by mass to 8% by mass.

When the amount thereof is 0.5% by mass to 10% by mass, a coating film is sufficiently formed onto a pigment, leading to excellent image fastness, no increase of a viscosity, and good ejection of the ink.

The ink of the present invention may contain other resin particles in addition to the polycarbonate-modified urethane resin particles. However, in order to sufficiently fill the effects of the present invention, 50% or more of resin particles added to the ink is preferably polycarbonate-modified urethane resin particles, 70% or more thereof is more preferable.

Examples of the aforementioned other resin particles which can be contained in the ink in addition to the polycarbonate-modified urethane resin particles include acrylic resin particles, polyolefin resin particles, vinyl acetate resin particles, vinyl chloride resin particles, fluororesin particles, polyether resin particles, and polyester resin particles.

<Water-Soluble Organic Solvent>

Examples of the water-soluble organic solvent include polyhydric alcohols such as ethylene glycol, diethylene glycol, 1,2-propanediol (propylene glycol), 1,3-propanediol, 1,2-butanediol, 1,3-butanediol, 2,3-butanediol, 3-methyl-1,3-butanediol, triethylene glycol, polyethylene glycol, polypropylene glycol, 1,5-pentanediol, 1,6-hexanediol, glycerin, 1,2,6-hexanetriol, 2-ethyl-1,3-hexanediol, ethyl-1,2,4-butanetriol, 1,2,3-butanetriol, petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether; polyhydric alcohol aryl ethers such as ethylene glycol monophenyl ether, ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, γ-butyrolactone; amides such as formamide, N-methylformamide, N,N-dimethylformamide; amines such as monoethanolamine, diethanolamine, triethylamine; sulfur-containing compounds such as dimethyl sulfoxide, sulfolane, thiodiethanol; and propylene carbonate and ethylene carbonate. These may be used alone or in combination.

Among them, a water-soluble organic solvent having a boiling point of 220° C. or less is preferable, and 1,2-propanediol (propylene glycol), 1,3-propanediol, 1,2-butanediol, 1,3-butanediol, and 2,3-butanediol are particularly preferable since they are compatible with the polycarbonate-modified urethane resin particles and can achieve an ink having more excellent film forming property.

When the water-soluble organic solvent having a boiling point of 220° C. or less is used, it is effective for the resulting ink to achieve better drying property.

The amount of the water-soluble organic solvent is preferably from 20% by mass to 70% by mass relative to the total amount of inkjet ink, and more preferably from 30% by mass to 70% by mass relative to the total amount thereof. When the amount thereof is from 20% by mass to 70% by mass, an ink having excellent ejection stability may be obtained because it is difficult for the ink to dry and it can achieve to maintain an appropriate viscosity. As a result, the ink having excellent ejection stability can be obtained.

<Pigment>

As for the pigment, those such as a cyan pigment, a magenta pigment, a yellow pigment, a black pigment, and a white pigment can be contained in the inkjet ink.

Examples of colors for the pigments include black, white, and pigments for colors. These may be used alone or in combination.

Examples of the pigments for black include carbon black produced by known production methods such as a channel method, an oil furnace method, an acetylene black method, a thermal black method.

Examples of the pigments for white include titanium dioxide, zinc oxide, silica, alumina, magnesium oxide, barium sulfate, and calcium carbonate.

Examples of the pigments for a yellow ink include C. I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150, 153, and 155.

Examples of pigments for a magenta ink include C. I. Pigment Red 1, 2, 3, 5, 17, 22 (brilliant fast scarlet), 23, 31, 38, 48:2 (Permanent Red 2B(Ba)), 48:2 (Permanent Red 2B(Ca)), 48:3 (Permanent Red 2B(Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 6G Lake), 83, 88, 92, 101 (red iron oxide), 104, 105, 106, 108 (cadmium red), 112, 114, 122 (dimethylquinacridone), 123, 146, 149, 166, 168, 170, 172, 177, 178, 179, 185, 190, 193, 209, and 219.

Examples of pigments for a cyan ink include C. I. Pigment Blue 1, 2, 15 (Copper Phthalocyanine R), 15:1, 15:2, 15:3 (Phthalocyanine Blue G), 15:4, 15:6 (Phthalocyanine Blue E), 16, 17:1, 56, 60, and 63.

Examples of pigments for intermediate colors include C. I. Pigment Red 194, 224; C. I. Pigment Orange 43; C. I. Pigment Violet 3, 19, 23, 37; and C. I. Pigment Green 7, and 36.

The amount of the pigment is, relative to the total amount of the inkjet ink, preferably from 0.1% by mass to 10% by mass, more preferably from 1% by mass to 10% by mass. The amount of the pigment falling within the range of 0.1% by mass to 10% by mass is preferable since it is possible to obtain high image density, achieve high image quality without causing problems such as unfavorable fixability, unfavorable ejection stability, and clogging.

<Ultraviolet Absorber>

The ultraviolet absorber is added to the ink in order to improve image fastness, particularly light resistance.

The ultraviolet absorber is not particularly limited and may be appropriately selected depending on the intended purpose. Examples thereof include benzophenone-based ultraviolet absorbers, benzotriazole-based ultraviolet absorbers, salicylate-based ultraviolet absorbers, cyanoacrylate-based ultraviolet absorber, and nickel complex salt-based ultraviolet absorbers, anilide oxalate-based ultraviolet absorbers, triazine-based ultraviolet absorbers, and water dispersion of acrylic polymer particles containing these ultraviolet absorbers. These may be used alone of in combination.

Examples of the benzophenone-based ultraviolet absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, 2,2',4,4'-tetrahydroxybenzophenone.

Examples of the benzotriazole-based ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, 2-(2'-hydroxy-3'-tert-butyl-5'-methylphenyl)-5-chlorobenzotriazole.

Examples of the salicylate-based ultraviolet absorbers include phenylsalicylate, p-tert-butylphenylsalicylate, p-octylphenylsalicylate.

Examples of the cyanoacrylate-based ultraviolet absorbers include ethyl-2-cyano-3,3'-diphenylacrylate, methyl-2-cyano-3-methyl-3-(p-methoxyphenyl)acrylate, butyl-2-cyano-3-methyl-3-(p-methoxyphenyl)acrylate.

Examples of the nickel complex salt-based ultraviolet absorbers include nickel bis(octylphenyl)sulphide, 2,2'-thiobis(4-tert-octylferrate)-n-butylamine nickel(II), 2,2'-thiobis(4-tert-octylferrate)-2-ethylhexylamine nickel(II), 2,2'-thiobis(4-tert-octylferrate)triethanolamine nickel(II).

As the ultraviolet absorber, commercially available products may be used. Examples thereof include TINUVIN 1130 (product of BASF), TINUVIN 479-DW (which is contained in water-insoluble acrylic polymer particles in the form ater dispersion, product of BASF), TINUVIN 99-DW (which is contained in water-insoluble acrylic polymer particles in the form of water dispersion, product of BASF).

Among them, water dispersion of the UV absorber-containing acrylic polymer particles may be suitably used.

Here, the UV absorber-containing" means either or both of a state in which the ultraviolet absorber is encapsulated in the acrylic polymer particle and a state in which an ultraviolet absorber is absorbed onto a surface of the acrylic polymer particle. In this case, all of ultraviolet absorbers incorporated in the ink of the present invention is not necessarily encapsulated or adsorbed onto acrylic polymer particles. The ultraviolet absorber may be dispersed in the emulsion provided that effects of the present invention are not impaired.

The ultraviolet absorber is not particularly limited and may be appropriately selected depending on the intended purpose provided that the ultraviolet absorber is water-insoluble (or poorly water-insoluble) and is an ultraviolet absorber which can be absorbed by the acrylic polymer or an ultraviolet absorber which is dispersed into an emulsion.

Here, the "being water-insoluble" means that the amount of the ultraviolet absorber dissolved is, relative to 100 parts of the amount of water at 25° C., 10 parts by mass or less, preferably 5 parts by mass or less, and more preferably 1 part by mass or less. "Being dissolved" means that the ultraviolet absorber is visually not found to separate or precipitate in the surface layer or the lower layer of the aqueous solution.

The volume average particle diameter of the water dispersion of acrylic polymer particles containing the UV absorber is preferably from 10 nm or more to 350 nm or less from the viewpoints of storage stability and ejection stability of the resulting ink.

The amount of the ultraviolet absorber is, relative to the total amount of the inkjet ink, preferably from 0.05% by mass to 1% by mass, more preferably from 0.2% by mass to 1% by mass. When the amount thereof is 0.05% by mass or more, the addition effects can be adequately obtained. When the amount thereof is 1% by mass or less, there is not such a case that crystals precipitate around the nozzles when the ink is dried.

<Light Stabilizer>

To the ink to be prepared, the light stabilizer is added as an adjuvant for the ultraviolet absorber, which is contained in the ink in order to improve light resistance, As the light stabilizer, a hindered amine-based light stabilizer may be used.

As the hindered amine-based light stabilizer, commercially available products can be used. Examples thereof include TINUVIN 5100 (product of BASF), TINUVIN 123-DW (which is contained in water-insoluble acrylic polymer particles in the form of water dispersion, product of BASF).

Similar to the ultraviolet absorber, a light stabilizer which is contained in water-insoluble acrylic polymer particles in the form of water dispersion may be suitably used in the light stabilizer.

The amount of the light stabilizer is preferably from 0.05% by mass to 1% by mass relative to the total amount of the inkjet ink, more preferably from 0.2% by mass to 1% by mass or less relative to the total amount of the inkjet ink. When the amount thereof is 0.05% by mass or more, the addition effects can be adequately obtained. When the amount thereof is 1% by mass or less, there is not such a case that crystals precipitate around the nozzles when the ink is dried.

A mass ratio (A/B) of the ultraviolet absorber (A) to the light stabilizer (B) is preferably from 1/0.1 to 1/2, more preferably from 1/0.5 to 1/2. The adequate effects may be obtained provided that the numerical value is within the preferable range.

<Water>

Examples of the water include pure water such as ion exchanged water, ultrafiltrated water, Milli-Q water, and distilled water; or ultrapure water.

An amount thereof is not particularly limited and may be appropriately selected depending on the intended purpose.

<Polyethylene Wax>

The polyethylene wax is preferably added to the ink to be prepared in order to improve blocking resistance.

The amount of the polyethylene wax is preferably 1% by mass to 7% by mass, more preferably 1% by mass to 5% by mass, still more preferably 1% by mass to 3% by mass.

The amount thereof is preferably 1% by mass to 7% by mass since an ink having excellent fixing property and blocking resistance of the image may be obtained.

As the polyethylene wax, appropriately synthesized products or commercially available products may be used. Example of the commercially available products include AQUACER-513, AQUACER-515 (both products are of BYK Japan K.K.), POLYRON P-502 (product of Chukyo Yushi Co., Ltd).

<Levelling Agent>

The levelling agent is preferably added to the ink to be prepared as an adjuvant for the polyethylene wax, which is added thereto in order to improve blocking resistance.

As the levelling agent, polyether-modified polydimethylsiloxane may be used.

As the polyether-modified polydimethylsiloxane, appropriately synthesized products or commercially available products may be used. Examples of the commercially available products include BYK-333, BYK-UV3500 (both products are BYK Japan K.K.).

The amount of the poly-ether-modified polydimethylsiloxane is preferably 0.1% by mass to 5% by mass, more preferably 0.5% by mass to 3% by mass, still more preferably 1% by mass to 1.5% by mass.

The amount thereof is preferably 0.1% by mass to 5% by mass since an ink having excellent fixing property and blocking resistance of the image may be obtained.

<Other Ingredients>

The other ingredients are not particularly limited and may be appropriately selected depending on the intended purpose. Examples thereof include a surfactant, a penetrating agent, a pH adjusters, an antiseptic and antifungal agent, a chelating reagent, a rust preventive agent, and an oxygen absorber.

—Surfactant—

The surfactant is preferably added for the purpose of ensuring wettability onto a recording medium to the ink to be prepared.

The surfactant is not particularly limited and may be appropriately selected depending on the intended purpose. Examples thereof include an anionic surfactant, a nonionic surfactant, an ampholytic surfactant, and a fluorosurfactant.

Examples of the anionic surfactant include an acetic acid salt of polyoxyethylene alkyl ether, dodecylbenzene sulfonic acid salt, lauric acid salt, and polyoxyethylene alkyl ether sulfate salt.

Examples of the commercially available products of the anionic surfactant include NIKKOL ECTD-3NEX (product of Nikko Chemicals Co., Ltd.).

Examples of the nonionic surfactant include acetylene glycol-based surfactants, polyoxyethylene alkyl ether, polyoxyethylene alkylphenyl ether, polyoxyethylene alkyl ester, and polyoxyethylene sorbitan fatty acid ester.

Examples of the acetylene glycol-based surfactants include 2,4,7,9-tetramethyl-5-decine-4,7-diol, 3,6-dimethyl-4-octyne-3,6-diol, 3,5-dimethyl-1-hexyne-3-ol. Examples of commercially available products of the acetylene glycol-based surfactants include SURFYNOL 104, 82, 465, 485, and TG, all of which are products of Air Products and Chemicals, Inc. (USA).

Examples of the ampholytic surfactant include lauryl amino propionic acid salt, lauryl dimethyl betaine, stearyl dimethyl betaine, and lauryl dihydroxyethyl betaine. Specific examples thereof include lauryldimethylamine oxide, myristyldimethylamine oxide, stearyldimethylamine oxide, dihydroxyethyl lauryl amine oxide, polyoxyethylene coconut oil alkyldimethylamine oxide, dimethylalkyl(coconut)betaine, and dimethyl lauryl betaine.

As the fluorosurfactant, a fluorosurfactant represented by the following General Formula (A) is preferable.

$$CF_3CF_2(CF_2CF_2)_m\text{—}CH_2CH_2O(CH_2CH_2O)_nH \quad \text{General Formula (A)}$$

In the general formula (A), m is an integer of 0 to 10, and n is an integer of 1 to 40.

Examples of the fluorosurfactant include a perfluoroalkyl sulfonic acid compound, a perfluoroalkyl carboxylic acid compound, a perfluoroalkyl phosphate compound, perfluoroalkyl ethylene oxide adduct, and a polyoxyalkylene ether polymer compound having a perfluoroalkyl ether group in a side chain thereof. Among them, the polyoxyalkylene ether polymer compound having a perfluoroalkyl ether group in a side chain thereof is particularly preferable since it has low foaming property and also has high safety by virtue of being low in bioaccumulative property of fluorine compounds, which has been becoming a problem in recent years.

Examples of the perfluoroalkyl sulfonic acid compound include perfluoroalkyl sulfonic acid, and perfluoroalkyl sulfonic acid salt.

Examples of the perfluoroalkyl carboxylic acid compound include perfluoroalkyl carboxylic acid, and perfluoroalkyl carboxylic acid salt.

Examples of the perfluoroalkyl phosphate compound include perfluoroalkyl phosphate, and perfluoroalkyl phosphoric acid ester salt.

Examples of the polyoxyalkylene ether polymer compound having the perfluoroalkyl ether group in a side chain thereof include polyoxyalkylene ether polymer having a perfluoroalkyl ether group in a side chain thereof, a sulfuric acid ester salt of polyoxyalkylene ether polymer having a perfluoroalkyl ether in a side chain thereof, and a salt of polyoxyalkylene ether polymer having a perfluoroalkyl ether group in a side chain thereof.

Examples of the counter ion of the salt of these fluorosurfactants include Li, Na, K, $NH_4$, $NH_3CH_2CH_2OH$, $NH_2(CH_2CH_2OH)_2$, and $NH(CH_2CH_2OH)_3$.

As the fluorosurfactant, appropriately synthesized products or commercially available products may be used.

Examples of the commercially available products include SURFLON S-111, S-112, S-113, S-121, S-131, S-132, S-141, S-145 (all products are ASAHI GLASS CO., LTD.), FLOURAD FC-93, FC-95, FC-98, FC-129, FC-135, FC-170C, FC-430, FC-431 (all products are Sumitomo 3M Limited), MEGAFACE F-470, F1405, F-474 (all products are DIC Corporation), ZONYL TBS, FSP, FSA, FSN-100. FSN, FSO-100, FSO, FS-300, UR (all products are Du Pont Kabushiki Kaisha), FT-110, FT-250, FT-251, FT-400S, FT-150, FT-400SW (all products are NEOS COMPANY LIMITED), and PF-151N (Omnova Solutions, Inc.). Among them, ZONYL FS-300, FSN, FSN-100, and FSO (all products are Du Pont Kabushiki Kaisha) are preferable from the viewpoints of excellent reliability and color improvement.

The amount of the surfactant is preferably from 0.1% by mass to 5% by mass relative to the total amount of the inkjet ink. When the amount thereof is 0.1% by mass or more, the resulting ink has satisfactory wettability onto a non-porous base, leading to improved image quality. When the amount is 5% by mass or less, the resulting ink may be obtained excellent ejection stability in some cased due to difficulty of forming the ink.

—Penetrating Agent—

Examples of the penetrating agent include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexane diol, and 5-hexene-1,2-diol, and 2-ethyl-1,3-hexanediol. These may be used alone or in combination.

Among them, 2-ethyl-1,3-hexanediol and, 2,4-trimethyl-1,3-pentanediol are preferable.

Examples of other penetrating agent include alkyl and aryl ethers of polyhydric alcohols, such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol.

The amount of the penetrating agent is preferably from 0.1% by mass to 4% by mass or less relative to the total amount of the inkjet ink. When the amount thereof is 0.1% by mass or more, satisfactory quick-drying property can be achieved, leading to a non-blurred image. When the amount thereof is 4.0% by mass or less, the pigment is excellent in dispersion stability, making it likely not to cause a clogged nozzle. Alternatively, the resultant ink favorably penetrates into a recording medium, leading to no problems such as deterioration in the image density or occurrence of set-off.

—pH Adjusters—

The pH adjuster is not particularly limited and may be appropriately selected depending on the intended purpose, so long as it can adjust the pH from 7 to 11, without adversely affecting the resultant ink. Examples thereof include alcohol amines, hydroxides of alkali metal elements, hydroxides of ammonium, hydroxides of phosphonium and carbonates of alkali metals.

When the pH is from 7 to 11, a small amount of an inkjet head or an ink supply unit is dissolved out, potentially leading to problems such as deterioration, leakage, or ejection failure of the resultant ink.

Examples of the alcohol amines include diethanolamine, triethanolamine, and 2-amino-2-ethyl-1,3-propanediol.

Examples of the hydroxides of alkali metal elements include lithium hydroxide, sodium hydroxide, and potassium hydroxide.

Examples of the hydroxides of ammonium include ammonium hydroxide, and quaternary ammonium hydroxide.

Examples of the hydroxides of phosphonium include quaternary phosphonium hydroxide.

Examples of the carbonates of alkali metals include lithium carbonate, sodium carbonate, and potassium carbonate.

—Antiseptic and Antifungal Agent—

Examples of the antiseptic and antifungal agent include sodium dehydroacetate, sodium sorbate, 2-pyridinethiol-1-oxide sodium, sodium benzoate, and pentachlorophenol sodium.

Examples of the chelating reagent include sodium ethylenediamine tetraacetate, sodium nitrilotriacetate, sodium hydroxyethyl ethylenediamine triacetate, sodium diethylenetriamine pentaacetate, and sodium uramil diacetate.

Examples of the rust preventive agent include acidic sulfite, sodium thiosulfate, ammonium thiodiglycolate, diisopropyl ammonium nitrite, pentaerythritol tetranitrate, and dicyclohexyl ammonium nitrite.

—Antioxidant—

Examples of the antioxidant include phenolic antioxidants (including hindered phenolic antioxidants), amine-based antioxidants, sulfur-based antioxidants, and phosphorus-based antioxidants.

<Production Method of Inkjet Recording Ink>

The inkjet ink is produced by dispersing or dissolving a pigment, a water-soluble organic solvent, polycarbonate-modified urethane resin particles, an ultraviolet absorber, a light stabilizer, a polyethylene wax, and a levelling agent, and if necessary other ingredients into water, followed by appropriately stirring and mixing. The stirring and mixing can be performed with a sand mill, a homogenizer, a ball mill, a paint shaker, or an ultrasonic disperser.

<<Physical Properties of Inkjet Ink>>

Physical properties of the ink of the present invention are not particularly limited and may be appropriately selected depending on the intended purpose. For example, a viscosity and a surface tension preferably the ranges described as follows.

A viscosity of the inkjet ink is preferably from 5 mPa·s to 25 mPa·s at 25° C. When the viscosity is 5 mPa·s or more, an effect of improving printing density and character quality can be attained. When the viscosity is 25 mPa·s or less, ejection property can be ensured.

For example, the viscosity can be measured at 25° C. by means of a viscometer (RL-550, product of Toki Sangyo Co., Ltd.).

A surface tension of the ink is preferably 30 mN/m or less, and more preferably 28 mN/m or less at 25° C. When the surface tension of the ink is 30 mN/m or less, the ink penetrates into the recording medium and beading is decreased, leading to good drying property on plain paper. More excellent coloring can be achieved and white spots can be improved in the recording medium because the ink is easy to wet to a pre-treatment layer. When the surface tension is 30 mN/m or less, it is preferable that leveling of the ink is prevented on a recording medium, and the ink does not take a long time to be dried.

The inkjet ink of the present invention can be suitably used with a printer equipped with any of a piezo inkjet head, a thermal inkjet head, an electrostatic inkjet head, where the piezo inkjet head is configured to eject ink droplets by deforming a vibration plate constituting of a wall surface of an ink flow channel to change the volume inside the ink flow channel using a piezoelectric element as a pressure generating unit for compressing the ink within the ink (see JP-A No. 02-51734), the thermal inkjet head is configured to generate air bubbles by heating an ink within an ink flow channel using a heat element (see JP-A No. 61-59911), and the electrostatic inkjet heat is configured to eject ink droplets by deforming a vibration plate with electrostatic force generated between the vibration plate and an electrode provided on a wall surface of an ink flow channel to face the vibration plate, to thereby change the volume inside the ink flow channel (see JP-A No. 06-71882).

(Ink Cartridge)

An ink cartridge of the present invention contains the inkjet ink of the present invention and a container, and further includes other materials such as an ink bag, if necessary. By means of this, operations such as replacement of an ink are not needed to directly touch the ink, leading to no concern in making fingers and clothes dirty, and contamination such as dust can be prevented to the ink.

The shape, structure, and material of the container are not particularly limited and may be appropriately selected depending on the intended purpose. For example, those having an ink bag made of aluminum laminated film or resin film may be suitable.

Figure 2:
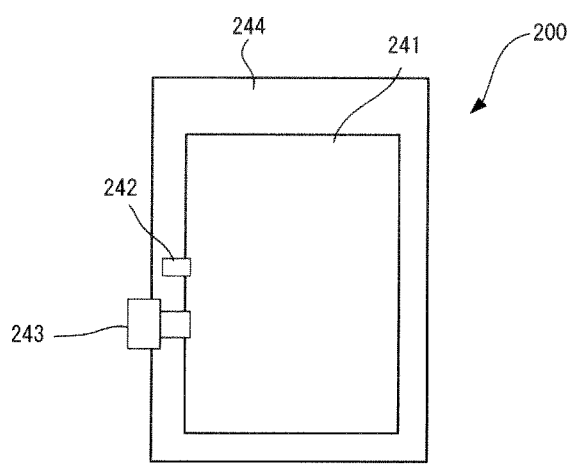
FIG. 2 is a schematic diagram illustrating the ink cartridge of FIG. 1 including a case.

One example of the ink cartridge will be described with reference to FIGS. 1 and 2. FIG. 1 is a schematic diagram illustrating one example of an ink bag 241 of an ink cartridge. FIG. 2 is a schematic diagram illustrating an ink cartridge 200 where the ink bag of FIG. 1 is housed in the cartridge case 244.

As shown in FIG. 1, an ink bag 241 is filled with ink via an ink inlet 242. After the remaining air is discharged from the ink bag, the ink inlet 242 is sealed by welding. When using, a needle provided in a device body is stuck into an ink outlet 243, which is made of a rubber member, to thereby supply the ink to the device. The ink bag 241 is made from a packaging material such as an aluminum laminated film with no air permeability. As shown in FIG. 2, the ink bag 241 is usually stored in a cartridge case 244 which is made of plastics, and is configured to be detachably mounted on various inkjet recording devices as an ink cartridge 200.

The ink cartridge is preferably configured to be detachably mounted on the inkjet recording device. As a result, the ink can be easily supplied and replaced and operating properties may be improved.

(Inkjet Recording Method and Inkjet Recording Device)

An inkjet recording device of the present invention includes an ink jetting unit and a heating unit, and if necessary, further includes other units selected appropriately such as a stimulus generating unit and a controlling unit.

An inkjet recording method of the present invention includes an ink jetting step and a heating step, and if necessary, further includes other steps selected appropriately such as a stimulus generating unit and a controlling unit.

The inkjet recording method of the present invention can be suitably performed by means of the inkjet recording device of the present invention, and the ink jetting step can be suitably performed by means of the ink jetting unit. The heating step can be suitably performed by means of the heating unit. The other steps can be suitably performed by means of the other units.

—Ink Jetting Step and Ink Jetting Unit—

The ink jetting step is a step of applying a stimulus to the inkjet ink of the present invention to allow the inkjet ink to jet, to thereby form an image.

The ink jetting unit is a unit configured to apply a stimulus to the inkjet ink of the present invention to allow the inkjet ink to jet, to thereby form an image. The ink jetting unit is not particularly limited. Examples thereof include an inkjet head.

The inkjet head is, for example, any of the following: a piezo inkjet head configured to eject ink droplets by deforming a vibration plate constituting of a wall surface of an ink flow channel to change the volume inside the ink flow channel using a piezoelectric element as a pressure generating unit for compressing the ink within the ink (see JP-A No. 02-51734); a thermal inkjet head configured to generate air bubbles by heating an ink within an ink flow channel using a heat element (see JP-A No. 61-59911); and an electrostatic inkjet head configured to eject ink droplets by deforming a vibration plate with electrostatic force generated between the vibration plate and an electrode provided on a wall surface of an ink flow channel to face the vibration plate, to thereby change the volume inside the ink flow channel (see JP-A No. 06-71882).

The stimulus can be generated, for example, by the stimulus generating unit. The stimulus is not particularly limited and may be appropriately selected depending on the intended purpose. Examples thereof include heat (temperature), pressure, vibration, and light. These may be used alone or in combination. Among them, heat and pressure are suitable.

Examples of the stimulus generating unit include a heating device, a pressurizing device, a piezoelectric element, a vibration generator, an ultrasonic wave oscillator, and a light. Specific examples thereof include a piezoelectric actuator such as a piezoelectric element; a thermal actuator utilizing a phase change due to film boiling of liquid caused by using an electric-heat transducer such as a heat element; a shape memory alloy actuator utilizing a metal phase change due to a temperature change; and an electrostatic actuator utilizing electrostatic force.

An embodiment of the jetting of the ink is not particularly limited, and varies depending on the stimulus. In the case where the stimulus is "heat", for example, there is a method in which a thermal energy corresponding to a recording signal is applied to the ink in a recording head, for example, by a thermal head, to thereby generate bubbles in the ink by the action of the thermal energy, and then, by the action of pressure of the bubbles, droplets of the ink are allowed to be ejected from a nozzle hole of the recording head. Meanwhile, in the case where the stimulus is "pressure", there is a method in as which voltage is applied to a piezoelectric element adhered to a pressure chamber in an ink flow channel within a recording head, to thereby bend the piezoelectric element, and reduce a volume of the pressure chamber, so that droplets of the ink are allowed to be ejected from a nozzle hole of the recording head.

The sizes of the droplets of the inkjet ink to jetted are, for example, preferably 3 pl to 40 pl, the speed of the ejection and jetting is preferably 5 m/s to 20 m/s, the driving frequency thereof is preferably 1 kHz or greater, and the resolution thereof is preferably 300 dpi or higher.

The controlling unit is not particularly limited and may be appropriately selected depending on the intended purpose, provided that it can control the operation of each unit, and examples thereof include a device such as a sequencer and a computer.

—Heating Step and Heating Unit—

Printing with high image quality can be achieved by using the ink of the present invention even when the recording medium is a non-porous base. However, in order to form an image having much higher image quality, high scratch resistance and adhesive property, and adapt the ink to high speed-printing condition, the recording medium is heated by a heating unit after printing.

Many known heating devices may be used as the heating unit. Examples of the heating device include a device for forced-air heating, radiation heating, conduction heating, high-frequency drying, or microwave drying. These may be used alone or combination.

A heating temperature can vary depending on a type and amount of a water-soluble organic solvent contained in an ink, and the minimum film forming temperature of a resin to be added, as well as a type of a base to be printed.

The heating temperature is preferably high from the viewpoints of a drying property and a film forming temperature. However, excessively high heating temperature is not preferable, because there are possibilities that the base to be printed is damaged and the ink is not ejected due to an increase of an ink head temperature.

Accordingly, the heating condition is not particularly limited and may be appropriately selected depending on the intended purpose. A heating temperature is preferably from 30° C. to 110° C., and a heating time is preferably from 300 seconds to 3,600 seconds.

Figure 3:
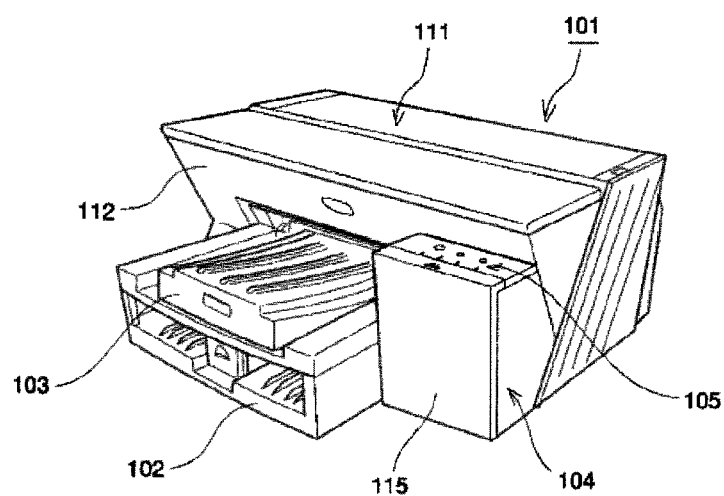
FIG. 3 is a perspective diagram illustrating one example of an inkjet recording device.

This inkjet recording device shown in FIG. 3 contains a device main body 101, a paper feeding tray 102 provided in the device main body 101 and configured to feed a sheet of paper, and a paper discharging tray 103 provided in the device main body 101 and configured to store a sheet of paper on which an image has been recorded (formed). A top cover 111 which is an upper surface of a main body 101 has approximately flat surface. A front face 112 of the front cover of the device main body 101 is descended obliquely backward to the upper surface. In the downward side of the descending front face 112, a paper discharging tray 103 which be protruded forward (near side) from the front surface and a paper feeding tray 102 are equipped. In the end side of the front face 112, an ink cartridge loading section 104 which is protruded forward from the front face 112 and which is located on lower position than the top cover 111 is provided. On the upper plane of the ink cartridge loading section 104, a control unit 105 such as operation keys and a display is provided. The ink cartridge loading section 104 has a front cover 115 that can be open for attaching or detaching the ink cartridge 201

Figure 4:
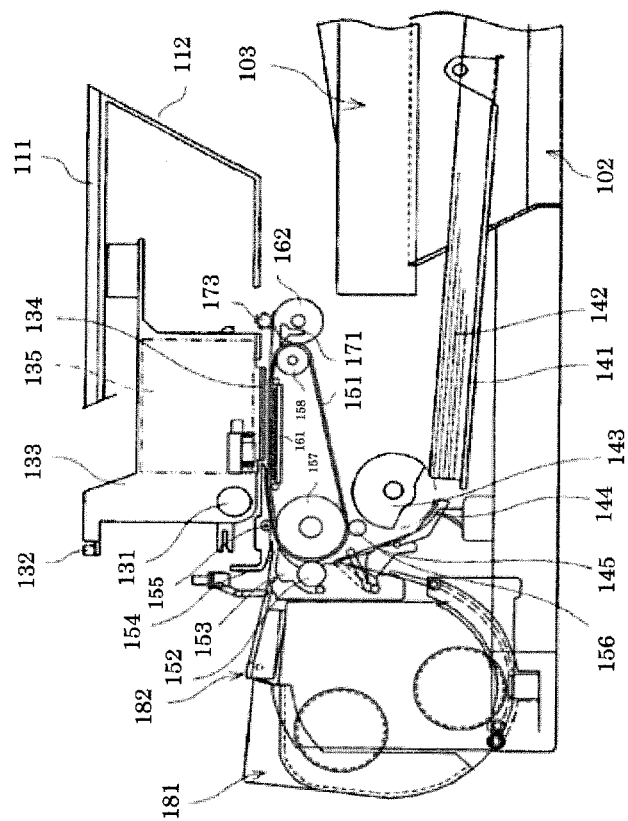
FIG. 4 is a schematic diagram illustrating another example of an inkjet recording device.
Figure 5:
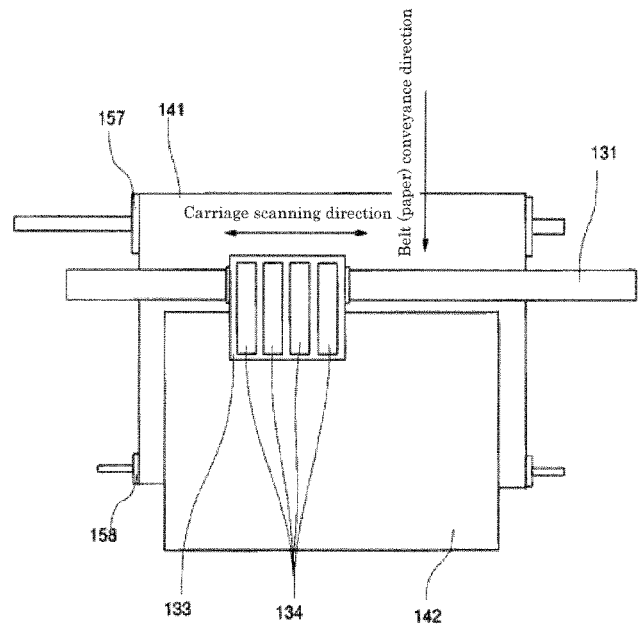
FIG. 5 is a schematic plan diagram of essential parts illustrating one example of a mechanical part of an inkjet recording device.

In the device main body 101, as illustrated in FIGS. 4 and 5, a carriage 133 is freely slidably held in the main scanning direction by a guide rod 131, which is a guide member laterally passed between left and right side plates, and is not illustrated, and a stay 132; and the carriage 133 is moved for scanning in the arrow direction in FIG. 5 by a main scanning motor, which is not illustrated.

A recording head 134 composed of four inkjet recording heads configured to eject ink droplets of yellow, cyan, magenta and black is installed in the carriage 133 such that a plurality of ink ejection outlets are aligned in the direction intersecting the main-scanning direction and that the ink droplet ejection direction faces downward.

As an option, an inkjet head configured to eject white ink droplets may be newly mounted on the recording head 134. In this case, the number of the inkjet recording heads mounted may be five in the recording head 134. Note that, in FIGS. 5 and 6, an example where the numbers thereof are four is shown. However, it is not particularly limited and the numbers thereof needed are arranged depending on the numbers of other inks to be used in addition to the ink of the present invention (white ink) to be used.

For each of the inkjet recording heads constituting the recording head 134, it is possible to use, for example, a head provided with any of the following energy-generating units for ejecting ink: a piezoelectric actuator such as a piezoelectric element; a thermal actuator utilizing a phase change due to film boiling of liquid caused by using an electric-heat transducer such as a heat element; a shape memory alloy actuator utilizing a metal phase change due to a temperature change; and an electrostatic actuator utilizing electrostatic force.

In a nozzle surface which is an ejection part of the inkjet head, a layer formed with Ni/PTFE eutectoid, a silicone resin, a fluorine-based water repellent imparting agent is arranged in order to improve ejection stability and wiping property. In the present invention, a surface energy of an inner wall of the nozzle hole provided depending on an ejected liquid. When the surface energy of the nozzle surface is also compatible with the surface energy of the inner wall of the nozzle holes, effective results can be obtained. Accordingly, the surface energy of an inner wall in the nozzle is performed in the same treatment as in the nozzle surface, if necessary.

The carriage 133 is provided with sub-tanks 135 for each color configured to supply each color ink to the recording head 134. Each sub-tank 135 is supplied and replenished with the ink from the ink cartridge loaded into the ink cartridge loading section 105, via an ink supply tube, which is not illustrated. Meanwhile, as a paper feeding section configured to feed sheets of paper 142 loaded on a paper loading section (pressurizing plate) 141 of the paper feed tray 103, there are provided a half-moon roller (paper feeding roller) 143 which feeds sheets of paper 142 one by one from the paper loading section (pressurizing plate) 141, and a separation pad 144 which faces the paper feeding roller 143 and is formed of a material with a large friction coefficient. This separation pad 144 is biased toward the paper feeding roller 143 side.

As a conveyance section configured to convey the sheet of paper 142, which has been fed from this paper feeding section, underneath the recording head 134, there are provided a conveyance belt 151 configured to convey the sheet of paper 142 by means of electrostatic adsorption; a counter roller 152 configured to convey the sheet of paper 142, which is fed from the paper feeding section via a guide 145, while the sheet of paper is sandwiched between the counter roller and the conveyance belt 151; a conveyance guide 153 configured to make the sheet of paper 142, which is fed upward in the substantially vertical direction, change its direction by approximately 90° and thusly run along the conveyance belt 151; and an end pressurizing roller 155 biased toward the conveyance belt 151 side by a pressing member 154. Also, there is provided a charging roller 156 as a charging unit configured to charge a surface of the conveyance belt 151.

Here, the conveyance belt 151 is an endless belt; and is configured to rotate around in a belt conveyance direction by stretching between a conveyance roller 157 and a tension roller 158. The conveyance belt 151 includes, for example, a surface layer serving as a paper adsorbing surface, which is formed of a pure resin material having a thickness of approximately 40 μm for which resistance control has not been conducted such as PTFE pure material; and a back layer (intermediate resistance layer, ground layer) which is formed of the same material as the surface layer, and for which resistance control has been conducted using carbon. On the back of the conveyance belt 151, a guide member 161 is placed correspondingly to a region where printing is carried out by the recording head 134. Additionally, as a paper discharge section configured to discharge the sheet of paper 142 on which an image has been recorded by the recording head 134, there are provided a separation claw 171 configured to separate the sheet of paper 142 from the conveyance belt 151, a paper discharge roller 172, and a paper discharge roller 173, with the paper discharge tray 103 being placed below the paper discharge roller 172. A double-sided paper feeding unit 181 is detachably mounted on a rear surface portion of the device main body 101. The double-sided paper feeding unit 181 takes in the sheet of paper 142 returned by rotation of the conveyance belt 151 in the opposite direction and reverses it, then refeeds it between the counter roller 152 and the conveyance belt 151. Additionally, a manual paper feeding section 182 is provided on an upper surface of the double-sided paper feeding unit 181.

In the inkjet recording device configured above, the sheets of paper 142 are fed one by one from the paper feeding section, and the sheets of paper 142 fed upward in the substantially vertical direction is guided by the guide 145 and conveyed with being sandwiched between the conveyance belt 151 and the counter roller 152. Further, an end of the sheet of paper is guided by the conveyance guide 153 and pressed onto the conveyance belt 151 by the end pressurizing roller 155, so that the conveyance direction of the sheet of paper is changed by approximately 90°. On this occasion, the conveyance belt 151 is charged by the charging roller 156, and the sheet of paper 142 is electrostatically adsorbed onto the conveyance belt 151 and thusly conveyed. Here, by driving the recording head 134 according to an image signal while moving the carriage 133, ink droplets are ejected onto the sheet of paper 142 having stopped so as to perform recording for one line. Thereafter, the sheet of paper 142 is conveyed by a predetermined distance, and then recording for the next line is carried out.

On receipt of a recording completion signal or a signal indicating that a rear end of the sheet of paper 142 has reached a recording region, recording operation is finished, and the sheet of paper 142 is discharged onto the paper discharge tray 103. Once an amount of the ink remaining in the sub-tanks 135 has been detected as too small, a required amount of the ink is supplied from the ink cartridge into the sub-tanks 135.

Figure 6:
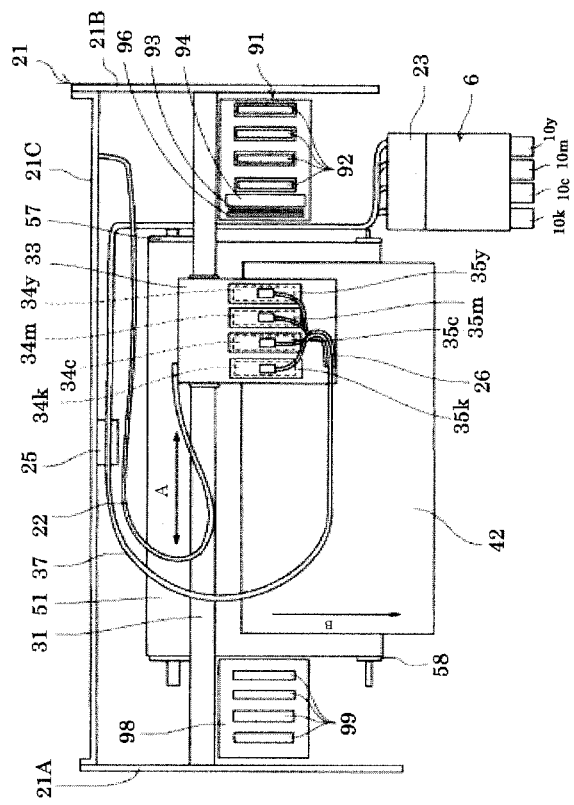
FIG. 6 is a schematic plan diagram illustrating one example of a mechanical part of an inkjet recording device.

As shown in FIG. 6, in non-printing region of one side in scanning direction in carriage 33, maintenance device 91 related to the present invention is arranged in order to maintain and recover a state of the nozzle of a recording head 34. Arrow A indicates carriage main-scanning direction, Arrow B indicates sub-scanning direction.

The maintenance device 91 is equipped with each of caps 92 configured to cap each of the nozzle surface of the recording head 34; wiper blade 93 configured to wipe the nozzle surface; a idle ejection receiver 94 configured to receive liquid droplets during idle ejection which is for ejection liquid droplets not contributing to recording in order to eject thickened ink; a wiper cleaner 94, which is a cleaning member, configured to be integrally molded with the idle ejection receiver, and configured to remove an ink adhered to a wiper blade 93; and a cleaner roller 96 serving as a cleaning unit, configured to press the wiper blade 93 to the side of the wiper cleaner during cleaning the wiper blade 93.

In the above configuration, by protruding the recording heads 34, in their moving pass which they pass through the position of the wiper blade 93, the ejection ports of the recording heads 34 are wiped.

Figure 7:
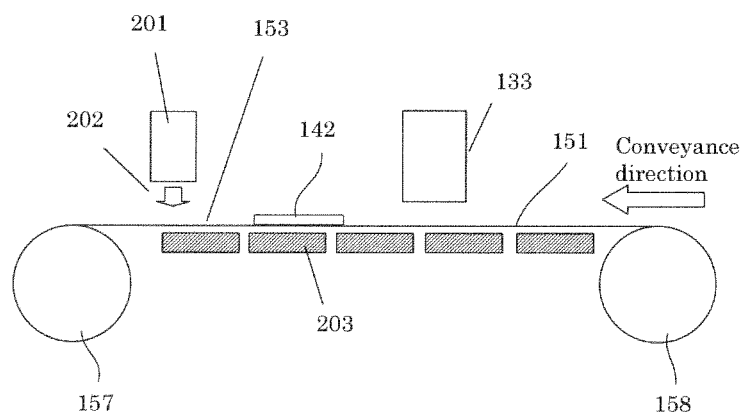
FIG. 7 is a schematic plan diagram illustrating one example of a heating unit of an inkjet recording device.

FIG. 7 is a schematic diagram illustrating one example of a heating unit of the inkjet recording device illustrated in FIG. 3. The heating unit shown in FIG. 7 is configured to dry by blowing warm air 202 against an image formed on a paper 142 which is conveyed on a conveyance belt 151 by means of a heating fan 201 as a warm air generating part.

Note that, a heater group 203 is arranged in the opposite site of the paper 142 on the conveyance belt 151, and can heat the paper 142 to be formed an image.

<Ink Recorded Matter>

An ink recorded matter recorded by means of an inkjet recording device and an inkjet recording method of the present invention is an ink recorded matter of the present invention. The ink recorded matter includes an image formed by means of the inkjet ink of the present invention on a recording medium.

The recording medium is not particularly limited and may be appropriately selected depending on the intended purpose. Examples of the recording medium include plain paper, glossy paper, special paper, cloth, film, and OHP sheet. These may be used alone or in combination.

Among them, when the inkjet ink of the present invention is applied onto a non-porous base, an image having good glossiness and image fastness can be provided. Examples of the non-porous base include plastic films such as vinyl chloride resin film, polyethylene terephthalate (PET) film, polycarbonate film, and the ink may be suitably used for them. However, the ink of the present invention exhibits satisfactory performance against other non-porous bases and conventional porous media such as plain paper or inorganic matter-coated porous medium.

The non-porous base is a base having a smooth surface of less unevenness on the surface, or an impermeability base.

The ink recorded matter has high image quality, has no bleeding, is excellent in stability over time, and can be suitably used in various applications, for example, as material on which characters or images are recorded.

EXAMPLES

The present invention will be described with reference to the following Examples. However, it should be noted that the present invention is not limited to these Examples.

Synthesis Example 1

Preparation of Polycarbonate-Modified Urethane Resin Emulsion

A reaction container equipped with a stirrer, a reflux condenser, and a thermometer as charged with 1,500 g of polycarbonate diol (reaction product of 1,6-hexanediol and dimethyl carbonate), 220 g of 2,2-dimethylol propionic acid (DMPA), and 1,347 g of dipropylene glycol dimethyl ether (bp: 171° C.) under a nitrogen stream. Then, the resultant mixture was heated to 60° C. and DMPA was dissolved.

To the resulting mixture, 1,445 g of 4,4'-dicyclohexyl-methane diisocyanate and 2.6 g of dibuthyltin dilaurate (catalyst) was added and heated to 90° C., followed by performing in ethanization reaction for 5 hours to obtain isocyanate-terminated urethane prepolymer.

The resultant mixture was cooled to 80° C. and 149 g of triethylamine was added thereto and mixed. Then, 4,340 g of the resultant mixture was taken out and added to a mixed solution of 5,400 g of water and 15 g of triethylamine under strong stirring.

Then, 1,500 g of ice was charged into the resulting mixture, 626 g of an aqueous solution of 2-methyl-1,5-pentanediamine (35 parts by mass) was added thereto, and followed by performing elongation reaction. The solvent was removed so that a concentration of solid content was 30% by mass to obtain polycarbonate-modified urethane resin particles-containing polycarbonate-modified urethane resin emulsion (component of urethane resin: 30% by mass, water: 64% by mass, dipropylene glycol dimethyl ether: 6% by mass).

The obtained polycarbonate-modified urethane resin emulsion was coated on a glass slide so that a film thickness was 10 μm, and followed by drying at 100° C. for 30 minute to mold a resin film. The film measured as follows was found to have Martens hardness of 120 N/mm$^2$.

<Measurement of Martens Hardness>

Polycarbonate-modified urethane resin emulsion is applied onto a glass slide so as to have a film thickness of 10 μm, followed by drying at 100° C. for 30 min to thereby form a resin film. The resultant resin film is measured for an indentation depth at the time when a Vickers indenter is indented with a load of 9.8 mN by means of a micro surface hardness meter (FISCHERSCOPE so HM2000, product of Fischer Instruments K.K.), and converted into a Martens hardness according to ISO14577-2002.

Preparation Example 1

Preparation of Yellow Pigment Dispersion Liquid

Prepared were 30.0 parts by mass of monoazo yellow pigment (C. I. Pigment Yellow 74, product of Dainichiseika Color & Chemicals Mfg. Co., Ltd), 10.0 parts by mass of polyoxyethylene styrene phenyl ether (nonionic surfactant, product of DKS Co. Ltd., NOIGEN EA-177, HLB=15.7), and 60.0 parts by mass of ion-exchanged water.

First, the nonionic surfactant was dissolved in ion-exchanged water. The pigment was mixed and the resultant mixture was allowed to be adequately moist. Then, zirconia beads having a diameter of 0.5 mm were loaded into a wet disperser (DYNO-MILL KDL A-type, product of WAB) and allowed to disperse at 2,000 rpm for 2 hours to obtain a primary pigment dispersion.

Then, 4.26 parts by mass of water soluble polyurethane resin (TAKELAC W-5661, product of Mitsui Chemicals, Inc., active ingredient: 35.2% by mass, acid value: 40 mg KOH/g, weight average molecular weight: 18,000) was added as an aqueous solution of water-soluble high polymer compound to the primary pigment dispersion and stirred adequately to obtain a yellow pigment dispersion liquid.

A volume average particle diameter of the pigment dispersion in the obtained yellow pigment dispersion liquid was measured by means of a particle size distribution measuring apparatus (NANOTRAC UPA-EX150, product of NIKKISO CO., LTD). As a result, the diameter thereof was found to be 62 nm.

Preparation Example 2

Preparation of Titanium Dioxide Surface-Treated with Silicone

By a vacuum dryer at 110° C. for 2 days, 10 parts by mass of titanium dioxide (CR-60, product of ISHIHARA SANGYO KAISHA, LTD.,) was dried, followed by charging into a 200 mL flask equipped with a pressure equalizing funnel, and the flask was purged with nitrogen gas. With 40 parts by mass of dehydrated toluene, 0.5 parts by mass of reactive silicone oil (KF-99, product of Shin-Etsu Chemical Co., Ltd.) was diluted. The resultant solution was added gradually to the flask by using the funnel and stirred. After the dropping, the resultant solution was heated by an oil bath and toluene was removed, followed by allowing to react at 150° C. for 3 hours. After termination of the reaction, a resultant solid matter was collected and washed thoroughly with toluene and methanol in this order. The solid matter was dried under reduced pressure at 60° C. for 1 day to obtain titanium dioxide surface-treated with silicone.

—Preparation of White Pigment-Containing Polymer Particle Dispersion—

A white pigment-containing polymer particle dispersion was prepared in the same manner as in Preparation Example 1 except that 30.0 parts by mass of monoazo yellow pigment (C.I. Pigment Yellow 74, product of Dainichiseika Color & Chemicals Mfg. Co., Ltd) was changed to 6 parts by mass of the titanium dioxide surface-treated with silicone prepared above. The obtained white pigment-containing polymer particles dispersion was measured by means of a particle size distribution measuring apparatus (NANOTRAC UPA-EX150, product of NIKKISO CO., LTD) and a volume average particle diameter thereof was found to be 280 nm.

Example 1

Preparation of Ink

After the following materials for ink were mixed and stirred, the resulting mixture was filtrated through a polypropylene filter having 0.2 μm of an average pore diameter to thereby prepare an ink.

[Formulation for Preparing Ink]

| | |
|---|---|
| Yellow pigment dispersion liquid of Preparation Example 1 | 15% by mass |
| Polycarbonate-modified urethane resin emulsion of Synthesis Example 1 (component of the urethane resin: 30% by mass, water: 64% by mass, dipropylene glycol dimethyl ether: 6% by mass) | 20% by mass |
| TINUVIN 1130 (product of BASF, ultraviolet absorber) | 0.01% by mass |
| TINUVIN 5100 (product of BASF, light stabilizer) | 0.03% by mass |
| $CH_3(CH_2)_{12}O(CH_2CH_2O)_3CH_2COONa$ as a surfactant (product of Nikko Chemicals Co., Ltd., NIKKOL ECTD-3NEX) | 2% by mass |
| Propylene glycol (bp: 188° C.) | 20% by mass |
| Diethylene grycol monobutyl ether (bp: 188° C.) | 15% by mass |
| Proxel LV as an antiseptic and antifungal agent (product of Avecia) | 0.1% by mass |
| Ion-exchanged water | 27.86% by mass |

Next, each of the following properties in the prepared ink was evaluated. The results were shown in Table 1.

<Drying Property>

Each of the prepared inks was charged into an inkjet printer (product of Ricoh Company, Ltd, a modified apparatus of IPSIO GXE5500), which has a heating fan as a heating unit. A solid image was printed on a white polyvinyl chloride sheet (IJ5331, product of 3M company), which is a porous base material, followed by drying by means of the heating fan at 60° C. for 1,800 seconds to form an image.

A filter paper was pressed against a post-dried solid portion. Each of the inks was evaluated for drying property according to the following criteria based on the degree of transfer of the ink to the filter paper.

[Evaluation Criteria]
A: Transfer to filter paper is not observed after drying at 25° C. for 15 min.
B: The transfer to filter paper is not observed after drying at 25° C. for 30 min.
C: The transfer to filter paper is not observed after drying at 25° C. for 60
D: The transfer paper is observed even after drying at 25° C. for 60 min.

<Image Glossiness>

Each of the prepared inks was charged into an inkjet printer (product of Ricoh Company, Ltd, a modified apparatus of IPSIO GXE5500), which has a heating fan as a heating unit. A solid image was printed on a white polyvinyl chloride sheet (IJ5331, product of 3M company), which is a porous base material, followed by drying by means of the heating fan at 60° C. for 1,800 seconds to form an image.

Then, a 60 degree-glossiness in a solid portion on the solid image was measured by means of a glossmeter (product of BYK Gardener, 4501). Each of the inks was evaluated for image glossiness according to the following criteria.

[Evaluation Criteria]
A: The 60 degree-glossiness is more than 100%.
B: The 60 degree-glossiness is from 80% to 100%.
C: The 60 degree-glossiness is from 60% or more but less than 80%.
D: The 60 degree-glossiness is less than 60%.

<Scratch Resistance>

Each of the prepared inks was charged into an inkjet printer (product of Ricoh Company, Ltd, a modified apparatus of IPSIO GXE5500), which has a heating fan as a heating unit. A solid image was printed on a white polyvinyl chloride sheet (IJ5331, product of 3M company), which is a porous base material, followed by drying by means of the heating fan at 60° C. for 1,800 seconds to form an image. Then, a solid portion of the solid image was scratched with a dry cotton cloth (KANAIGN No. 3) with a load of 400 g. Each of the inks was evaluated for scratch resistance according to the following criteria.

[Evaluation Criteria]
A: The solid image is not changed even when the solid image is scratched for 50 times or more.
B: When the solid image has been scratched for 50 times, few scratches were remained in the solid image, but the image density is not affected and the practical problem is not observed.
C: The image density deteriorated while the solid image is scratched for 21 to 50 times.
D: The image density is deteriorated by scratching for 20 times or less.

<Ethanol Resistance>

Each of the prepared inks was charged into an inkjet printer (product of Ricoh Company, Ltd, a modified apparatus of IPSIO GXE5500), which has a heating fan as a heating unit. A solid image as printed on a white polyvinyl chloride sheet (IJ5331, product of 3M company), which is a porous base material, followed by drying by means of the heating fan at 60° C. for 1,800 seconds to form an image.

Then, a solid portion of the solid image was scratched for 20 times with a cotton swab which had been impregnated with a 50% aqueous solution of ethanol. Each of the inks was evaluated for ethanol resistance according to the following criteria based on the degree of the peeled coating membrane in the solid portion.

[Evaluation Criteria]
A: Peeling is not observed in the solid portion of the solid image and a stain is not found in the cotton swab.
B: Peeling is not observed in the solid portion of the solid image but a slight stain is observed in the cotton swab.
C: Elution of the ink is observed in the solid portion of the solid image.
D: An ink in the solid portion of the solid image is peeled and the white polyvinyl chloride sheet is exposed for 1 or more portion(s).

<Light Resistance>

Each of the prepared inks was charged into an inkjet printer (product of Ricoh Company, Ltd, a modified apparatus of IPSIO GXE5500), which has a heating fan as a heating unit. A solid image was printed on a white polyvinyl chloride sheet (IJ5331, product of 3M company), which is a porous base material, followed by drying by means of the heating fan at 60° C. for 1,800 seconds to form an image.

An exposure test was performed by using the each of the obtained image samples until the amount of light exposed reached 2,600 kJ/m$^2$ at 50% RH by means of a whetherometer, CI35A (product of Atlas, xenon light resource), in which both of an inner filter and an outer filter were used for a type S of a borosilicate glass, and the temperature of black panel was set up to 89° C. Then, color-faded states of the image before and after test were measured by means of X-RITE938 (product of X-Rite). Light resistance (color difference: ΔE*ab) was calculated by using the following formula and light resistance was evaluated according to the following criteria.

[Evaluation Criteria]

$$\Delta E^*ab = (\Delta L^{*2} + \Delta a^{*2} + \Delta b^{*2})^{1/2}$$

A: ΔE*ab≤5
B: 5<ΔE*ab≤10
C: 10<ΔE*ab≤20
D: 20<ΔE*ab

<Scratch Resistance after Light Resistance Test>

In a solid image after light resistance test in the evaluation of the light resistance, scratch resistance after light resistance test was evaluated according to the following criteria in the same manner as in the test of scratch resistance

[Evaluation Criteria]
A: The solid image is not changed even when the solid image is scratched for 50 times or more.
B: When the solid image has been scratched, few scratches were remained in the solid image, but the image density is not affected and the practical problem is not observed.
C: The image density is deteriorated while the solid image is scratched for 21 to 50 times.
D: The image density is deteriorated by scratching for 20 times or less.

<Blocking Resistance>

Each of the prepared inks was charged into an inkjet printer (product of Ricoh Company, Ltd, a modified apparatus of IPSIO GXE5500), which has a heating fan as a heating unit. A solid image was printed on a white polyvinyl chloride sheet (IJ5331, product of 3M company), which is a porous base material, followed by drying by means of the heating fan at 60° C. for 1,800 seconds to form an image.

Each of the obtained image samples was evaluated for blocking resistance based on TAPPI T477 test method, which is provided by Japan Technical Association of the Pulp and Paper Industry. Specifically, the solid image having a size of 6×6 cm was placed on a glass plate, then the back side of a white polyvinyl chloride sheet was placed on the solid image, and a glass plate having a size of 10×10 cm was placed thereon. Next, a load of 1 kg/m$^2$ was applied to the glass plate, which was left to stand for 24 hours under the environment of 40° C. and 90% RH, and allowed to stand for 2 hours at room temperature. Each of the white polyvinyl chloride sheets was visually observed for the degree of adherence thereof when the sheet was peeled, and blocking resistance was evaluated according to the following criteria.

[Evaluation Criteria]
A: The adjacent surfaces were freely slidable.
B: The adjacent surfaces were not freely slidable, but slidable with pressure and friction.
C: The adjacent surfaces were not easily slidable.
D: The adjacent surfaces were completely bonded together.

Examples 2 to 22 and Comparative Examples 1 to 9

Each of inkjet inks of Examples 2 to 22 and Comparative Examples 1 to 9 was prepared in the same manner as in Example 1 except that the ink materials of Example 1 were changed to the materials shown in Tables 1 to 10. Note that, each of the amounts of the components described in Tables 1 to 10 denotes "% by mass".

Properties of each of the inkjet ink prepared were evaluated in the same manner as in Example 1. Results were shown in Tables 1 to 10.

TABLE 1

| | | Examples | | | |
| --- | --- | --- | --- | --- | --- |
| Component names | | 1 | 2 | 3 | 4 |
| Water | Ion-exchanged water | 27.86 | 27.86 | 23.9 | 25.9 |
| Water-soluble | Propylene glycol | 20 | 20 | 20 | 20 |
| organic solvents | 2,3-Butanediol | — | — | — | — |
| | 1,2-Butanediol | — | — | — | — |

TABLE 1-continued

|  | Component names | Examples | | | |
|---|---|---|---|---|---|
|  |  | 1 | 2 | 3 | 4 |
|  | 1,3-Propanediol | — | — | — | — |
|  | 1,3-Butanediol | — | — | — | — |
|  | Diethylene grycol monobutyl ether | 15 | 15 | 15 | 15 |
| Water-dispersible resin | Polycarbonate-modified urethane resin emulsion of Synthesis Example 1 | 20 | 20 | 20 | 20 |
| Ultraviolet absorbers: A | TINUVIN 1130 | 0.01 | 0.02 | 2 | 1 |
|  | TINUVIN 479-DW | — | — | — | — |
|  | TINUVIN 99-DW | — | — | — | — |
| Light stabilizers: B | TINUVIN 5100 | 0.03 | 0.02 | 2 | 1 |
|  | TINUVIN 123-DW | — | — | — | — |
| Pigment dispersion liquid | Yellow pigment dispersion liquid of Preparation Example 1 | 15 | 15 | 15 | 15 |
| Surfactant | $CH_3(CH_2)_{12}O(CH_2CH_2O)_3CH_2COONa$ | 2 | 2 | 2 | 2 |
| Anti-fungal agent | Proxel LV | 0.1 | 0.1 | 0.1 | 0.1 |
|  | Total (% by mass) | 100 | 100 | 100 | 100 |
|  | Mass ratio (A/B) | 1/3 | 1/1 | 1/1 | 1/1 |
| Evaluation results | Drying property | A | A | A | A |
|  | Image glossiness | B | B | C | B |
|  | Scratch resistance | A | A | A | A |
|  | Ethanol resistance | B | B | B | B |
|  | Light resistance | C | B | A | B |
|  | Scratch resistance after light resistance test | B | B | B | B |
|  | Blocking resistance | A | A | A | A |

TABLE 2

|  | Component names | Examples | | | |
|---|---|---|---|---|---|
|  |  | 5 | 6 | 7 | 8 |
| Water | Ion-exchanged water | 20.9 | 20.9 | 20.9 | 20.9 |
| Water-soluble organic solvents | Propylene glycol | — | — | — | — |
|  | 2,3-Butanediol | 25 | 25 | — | — |
|  | 1,2-Butanediol | — | — | 25 | — |
|  | 1,3-Propanediol | — | — | — | 25 |
|  | 1,3-Butanediol | — | — | — | — |
|  | Diethylene grycol monobutyl ether | 15 | 15 | 15 | 15 |
| Water-dispersible resin | Polycarbonate-modified urethane resin emulsion of Synthesis Example 1 | 20 | 20 | 20 | 20 |
| Ultraviolet absorbers: A | TINUVIN 1130 | 1 | — | — | — |
|  | TINUVIN 479-DW | — | 1 | 1 | 1 |
|  | TINUVIN 99-DW | — | — | — | — |
| Light stabilizers: B | TINUVIN 5100 | 1 | — | — | — |
|  | TINUVIN 123-DW | — | 1 | 1 | 1 |
| Pigment dispersion liquid | Yellow pigment dispersion liquid of Preparation Example 1 | 15 | 15 | 15 | 15 |
| Surfactant | $CH_3(CH_2)_{12}O(CH_2CH_2O)_3CH_2COONa$ | 2 | 2 | 2 | 2 |
| Anti-fungal agent | Proxel LV | 0.1 | 0.1 | 0.1 | 0.1 |
|  | Total (% by mass) | 100 | 100 | 100 | 100 |
|  | Mass ratio (A/B) | 1/1 | 1/1 | 1/1 | 1/1 |
| Evaluation results | Drying property | A | A | A | A |
|  | Image glossiness | A | A | A | A |
|  | Scratch resistance | A | A | A | A |
|  | Ethanol resistance | B | A | A | A |
|  | Light resistance | B | A | A | A |
|  | Scratch resistance after light resistance test | B | A | A | A |
|  | Blocking resistance | A | A | A | A |

TABLE 3

|  | | Examples | | |
|---|---|---|---|---|
|  | Component names | 9 | 10 | 11 |
| Water | Ion-exchanged water | 20.9 | 20.9 | 20.9 |
| Water-soluble organic solvents | Propylene glycol | 25 | — | — |
|  | 2,3-Butanediol | — | — | 25 |
|  | 1,2-Butanediol | — | — | — |
|  | 1,3-Propanediol | — | — | — |
|  | 1,3-Butanediol | — | 25 | — |
|  | Diethylene grycol monobutyl ether | 15 | 15 | 15 |
| Water-dispersible resin | Polycarbonate-modified urethane resin emulsion of Synthesis Example 1 | 20 | 20 | 20 |
| Ultraviolet absorbers: A | TINUVIN 1130 | — | — | — |
|  | TINUVIN 479-DW | 1 | 1 | — |
|  | TINUVIN 99-DW | — | — | 1 |
| Light stabilizers: B | TINUVIN 5100 | — | — | — |
|  | TINUVIN 123-DW | 1 | 1 | 1 |
| Pigment dispersion liquid | Yellow pigment dispersion liquid of Preparation Example 1 | 15 | 15 | 15 |
| Surfactant | $CH_3(CH_2)_{12}O(CH_2CH_2O)_3CH_2COONa$ | 2 | 2 | 2 |
| Anti-fungal agent | Proxel LV | 0.1 | 0.1 | 0.1 |
|  | Total (% by mass) | 100 | 100 | 100 |
|  | Mass ratio (A/B) | 1/1 | 1/1 | 1/1 |
| Evaluation results | Drying property | A | A | A |
|  | Image glossiness | A | A | A |
|  | Scratch resistance | A | A | A |
|  | Ethanol resistance | A | A | A |
|  | Light resistance | A | A | A |
|  | Scratch resistance after light resistance test | A | A | A |
|  | Blocking resistance | A | A | A |

TABLE 4

|  | | Examples | | | |
|---|---|---|---|---|---|
|  | Component names | 12 | 13 | 14 | 15 |
| Water | Ion-exchanged water | 45.86 | 37.86 | 14.86 | 46.86 |
| Water-soluble organic solvents | Propylene glycol | 20 | 20 | 20 | 20 |
|  | 2,3-Butanediol | — | — | — | — |
|  | 1,2-Butanediol | — | — | — | — |
|  | 1,3-Propanediol | — | — | — | — |
|  | 1,3-Butanediol | — | — | — | — |
|  | Diethylene grycol monobutyl ether | 15 | 15 | 15 | 15 |
| Water-dispersible resin | Polycarbonate-modified urethane resin emulsion of Synthesis Example 1 | 2 | 10 | 33 | 1 |
| Ultraviolet absorbers: A | TINUVIN 1130 | 0.02 | 0.02 | 0.02 | 0.02 |
|  | TINUVIN 479-DW | — | — | — | — |
|  | TINUVIN 99-DW | — | — | — | — |
| Light stabilizers: B | TINUVIN 5100 | 0.02 | 0.02 | 0.02 | 0.02 |
|  | TINUVIN 123-DW | — | — | — | — |
| Pigment dispersion liquid | Yellow pigment dispersion liquid of Preparation Example 1 | 15 | 15 | 15 | 15 |
| Surfactant | $CH_3(CH_2)_{12}O(CH_2CH_2O)_3CH_2COONa$ | 2 | 2 | 2 | 2 |
| Anti-fungal agent | Proxel LV | 0.1 | 0.1 | 0.1 | 0.1 |
|  | Total (% by mass) | 100 | 100 | 100 | 100 |
|  | Mass ratio (A/B) | 1/1 | 1/1 | 1/1 | 1/1 |
| Evaluation results | Drying property | A | A | B | A |
|  | Image glossiness | B | B | A | C |
|  | Scratch resistance | C | B | A | C |
|  | Ethanol resistance | C | B | A | C |
|  | Light resistance | B | B | B | B |
|  | Scratch resistance after light resistance test | C | C | B | C |
|  | Blocking resistance | C | B | C | C |

TABLE 5

| | | Examples | | | |
|---|---|---|---|---|---|
| | Component names | 16 | 17 | 18 | 19 |
| Water | Ion-exchanged water | 7.86 | 27.87 | 26.8 | 26.89 |
| Water-soluble organic solvents | Propylene glycol | 20 | 20 | 20 | 20 |
| | 2,3-Butanediol | — | — | — | — |
| | 1,2-Butanediol | — | — | — | — |
| | 1,3-Propanediol | — | — | — | — |
| | 1,3-Butanediol | — | — | — | — |
| | Diethylene grycol monobutyl ether | 15 | 15 | 15 | 15 |
| Water-dispersible resin | Polycarbonate-modified urethane resin emulsion of Synthesis Example 1 | 40 | 20 | 20 | 20 |
| Ultraviolet absorbers: A | TINUVIN 1130 | 0.02 | 0.01 | 1 | 1 |
| | TINUVIN 479-DW | — | — | — | — |
| | TINUVIN 99-DW | — | — | — | — |
| Light stabilizers: B | TINUVIN 5100 | 0.02 | 0.02 | 0.1 | 0.01 |
| | TINUVIN 123-DW | — | — | — | — |
| Pigment dispersion liquid | Yellow pigment dispersion liquid of Preparation Example 1 | 15 | 15 | 15 | 15 |
| Surfactant | $CH_3(CH_2)_{12}O(CH_2CH_2O)_3CH_2COONa$ | 2 | 2 | 2 | 2 |
| Anti-fungal agent | Proxel LV | 0.1 | 0.1 | 0.1 | 0.1 |
| | Total (% by mass) | 100 | 100 | 100 | 100 |
| | Mass ratio (A/B) | 1/1 | 1/2 | 1/0.1 | 1/0.01 |
| Evaluation results | Drying property | C | A | A | A |
| | Image glossiness | A | B | B | B |
| | Scratch resistance | A | A | A | A |
| | Ethanol resistance | A | B | B | B |
| | Light resistance | B | C | B | B |
| | Scratch resistance after light resistance test | B | B | B | B |
| | Blocking resistance | C | A | A | A |

TABLE 6

| | | Examples | | |
|---|---|---|---|---|
| | Component names | 20 | 21 | 22 |
| Water | Ion-exchanged water | 20.9 | 31.86 | 30.36 |
| Water-soluble organic solvents | Propylene glycol | — | 20 | 20 |
| | 2,3-Butanediol | 25 | — | — |
| | 1,2-Butanediol | — | — | — |
| | 1,3-Propanediol | — | — | — |
| | 1,3-Butanediol | — | — | — |
| | Diethylene grycol monobutyl ether | 15 | 15 | 15 |
| Water-dispersible resin | Polycarbonate-modified urethane resin emulsion of Synthesis Example 1 | 20 | 2 | 2 |
| Ultraviolet absorbers: A | TINUVIN 1130 | — | 0.02 | 0.02 |
| | TINUVIN 479-DW | 1 | — | — |
| | TINUVIN 99-DW | — | — | — |
| Light stabilizers: B | TINUVIN 5100 | — | 0.02 | 0.02 |
| | TINUVIN 123-DW | 1 | — | — |
| Pigment dispersion liquids | Yellow pigment dispersion liquid of Preparation Example 1 | — | 15 | 15 |
| | White pigment dispersion liquid of Preparation Example 2 | 15 | — | — |
| Surfactant | $CH_3(CH_2)_{12}O(CH_2CH_2O)_3CH_2COONa$ | 2 | 2 | 2 |
| Anti-fungal agent | Proxel LV | 0.1 | 0.1 | 0.1 |
| Polyethylene wax | AQUACER-515 | — | 14 | 14 |
| Levelling agent | Polyether-modifed polydimethylsiloxane | — | — | 1.5 |
| | Total (% by mass) | 100 | 100 | 100 |
| | Mass ratio (A/B) | 1/1 | 1/1 | 1/1 |
| Evaluation results | Drying property | A | A | A |
| | Image glossiness | A | B | B |
| | Scratch resistance | A | B | A |
| | Ethanol resistance | A | C | C |
| | Light resistance | A | B | B |
| | Scratch resistance after light resistance test | A | C | C |
| | Blocking resistance | A | B | A |

TABLE 7

|  | Component names | Comparative Examples | | |
|---|---|---|---|---|
|  |  | 1 | 2 | 3 |
| Water | Ion-exchanged water | 45.9 | 26.9 | 26.9 |
| Water-soluble organic solvents | Propylene glycol | 20 | 20 | 20 |
|  | 2,3-Butanediol | — | — | — |
|  | 1,2-Butanediol | — | — | — |
|  | 1,3-Propanediol | — | — | — |
|  | 1,3-Butanediol | — | — | — |
|  | Diethylene grycol monobutyl ether | 15 | 15 | 15 |
| Water-dispersible resin | Polycarbonate-modified urethane resin emulsion of Synthesis Example 1 | — | 20 | 20 |
| Ultraviolet absorbers: A | TINUVIN 1130 | 1 | — | 1 |
|  | TINUVIN 479-DW | — | — | — |
|  | TINUVIN 99-DW | — | — | — |
| Light stabilizers: B | TINUVIN 5100 | 1 | 1 | — |
|  | TINUVIN 123-DW | — | — | — |
| Pigment dispersion liquid | Yellow pigment dispersion liquid of Preparation Example 1 | 15 | 15 | 15 |
| Surfactant | $CH_3(CH_2)_{12}O(CH_2CH_2O)_3CH_2COONa$ | 2 | 2 | 2 |
| Anti-fungal agent | Proxel LV | 0.1 | 0.1 | 0.1 |
|  | Total (% by mass) | 100 | 100 | 100 |
|  | Mass ratio (A/B) | 1/1 | — | — |
| Evaluation results | Drying property | B | A | A |
|  | Image glossiness | D | C | C |
|  | Scratch resistance | D | B | B |
|  | Ethanol resistance | D | C | C |
|  | Light resistance | B | D | D |
|  | Scratch resistance after light resistance test | D | C | C |
|  | Blocking resistance | C | B | B |

TABLE 8

|  | Component names | Comparative Examples | |
|---|---|---|---|
|  |  | 4 | 5 |
| Water | Ion-exchanged water | 25.9 | 25.9 |
| Water-soluble organic solvents | Propylene glycol | 20 | 20 |
|  | 2,3-Butanediol | — | — |
|  | 1,2-Butanediol | — | — |
|  | 1,3-Propanediol | — | — |
|  | 1,3-Butanediol | — | — |
|  | Diethylene grycol monobutyl ether | 15 | 15 |
| Water-dispersible resins | Acrylic resin emulsion | 20 | — |
|  | Polyether-based urethane resin emulsion | — | 20 |
| Water-dispersible resin | TINUVIN 1130 | 1 | 1 |
| Ultraviolet absorbers: A | TINUVIN 479-DW | — | — |
|  | TINUVIN 99-DW | — | — |
| Light stabilizers: B | TINUVIN 5100 | 1 | 1 |
|  | TINUVIN 123-DW | — | — |
| Pigment dispersion liquid | Yellow pigment dispersion liquid of Preparation Example 1 | 15 | 15 |
| Surfactant | $CH_3(CH_2)_{12}O(CH_2CH_2O)_3CH_2COONa$ | 2 | 2 |
| Anti-fungal agent | Proxel LV | 0.1 | 0.1 |
|  | Total (% by mass) | 100 | 100 |
|  | Mass ratio (A/B) | 1/1 | 1/1 |
| Evaluation results | Drying property | A | Unmeasurable due to severe unevenness in coating |
|  | Image glossiness | C |  |
|  | Scratch resistance | D |  |
|  | Ethanol resistance | D |  |
|  | Light resistance | A |  |
|  | Scratch resistance after light resistance test | D |  |
|  | Blocking resistance | C |  |

TABLE 9

| | | Comparative Examples | |
|---|---|---|---|
| | Component names | 6 | 7 |
| Water | Ion-exchanged water | 22.9 | 21.9 |
| Water-soluble organic solvents | Propylene glycol | — | — |
| | 2,3-Butanediol | 25 | 25 |
| | 1,2-Butanediol | — | — |
| | 1,3-Propanediol | — | — |
| | 1,3-Butanediol | — | — |
| | Diethylene glycol monobutyl ether | 15 | 15 |
| Water-dispersible resin | Polycarbonate-modified urethane resin emulsion of Synthesis Example 1 | 20 | 20 |
| Ultraviolet absorbers: A | TINUVIN 1130 | — | — |
| | TINUVIN 479-DW | — | 1 |
| | TINUVIN 99-BW | — | — |
| Light stabilizers: B | TINUVIN 5100 | — | — |
| | TINUVIN 123-DW | — | — |
| Pigment dispersion liquid | White pigment dispersion liquid of Preparation Example 2 | 15 | 15 |
| Surfactant | $CH_3(CH_2)_{12}O(CH_2CH_2O)_3CH_2COONa$ | 2 | 2 |
| Anti-fungal agent | Proxel LV | 0.1 | 0.1 |
| | Total (% by mass) | 100 | 100 |
| | Mass ratio (A/B) | — | — |
| Evaluation results | Drying property | A | A |
| | Image glossiness | B | B |
| | Scratch resistance | C | C |
| | Ethanol resistance | C | C |
| | Light resistance | C | B |
| | Scratch resistance after light resistance test | D | D |
| | Blocking resistance | C | C |

TABLE 10

| | | Comparative Examples | |
|---|---|---|---|
| | Component names | 8 | 9 |
| Water | Ion-exchanged water | 31.9 | 30.4 |
| Water-soluble organic solvents | Propylene glycol | 20 | 20 |
| | 2,3-Butanediol | — | — |
| | 1,2-Butanediol | — | — |
| | 1,3-Propanediol | — | — |
| | 1,3-Butanediol | — | — |
| | Diethylene glycol monobutyl ether | 15 | 15 |
| Water-dispersible resin | Polycarbonate-modified urethane resin emulsion of Synthesis Example 1 | — | — |
| Ultraviolet absorbers: A | TINUVIN 1130 | 1 | 1 |
| | TINUVIN 479-DW | — | — |
| | TINUVIN 99-DW | — | — |
| Light stabilizers: B | TINUVIN 5100 | 1 | 1 |
| | TINUVIN 123-DW | — | — |
| Pigment dispersion liquid | Yellow pigment dispersion liquid of Preparation Example 1 | 15 | 15 |
| | White pigment dispersion liquid of Preparation Example 2 | — | — |
| Surfactant | $CH_3(CH_2)_{12}O(CH_2CH_2O)_3CH_2COONa$ | 2 | 2 |
| Anti-fungal agent | Proxel LV | 0.1 | 0.1 |
| Polyethylene wax | AQUACER-515 | 14 | 14 |
| Levelling agent | Polyether-modified polydimethylsiloxane | — | 1.5 |
| | Total (% by mass) | 100 | 100 |
| | Mass ratio (A/B) | 1/1 | 1/1 |
| Evaluation results | Drying property | B | B |
| | Image glossiness | D | D |
| | Scratch resistance | C | B |
| | Ethanol resistance | D | D |
| | Light resistance | B | B |
| | Scratch resistance after light resistance test | D | D |
| | Blocking resistance | B | B |

Details of components shown in Tables 1 to 10 are as follows.

Propylene glycol (bp: 188° C.)
2,3-Butanediol (bp: 183° C.)
1,2-Butanediol (bp: 194° C.)
1,3-Propanediol (bp: 214° C.)
1,3-Butanediol (bp: 187° C.)
Diethylene grycol monobutyl ether (bp: 230° C.)
TINUVIN 1130 (product of BASF, ultraviolet absorber)
TINUVIN 479-DW (which is contained in water-insoluble acrylic polymer particles in the form of water dispersion, solid content of 20% by mass, product of BASF, ultraviolet absorber)
TINUVIN 99-DW (which is contained in water-insoluble acrylic polymer particles in the form of water dispersion, solid content of 20% by mass, product of BASF, ultraviolet absorber)
TINUVIN 5100 (product of BASF, light stabilizer)
TINUVIN 123-DW (which is contained in water-insoluble acrylic polymer particles in the form of water dispersion, solid content of 20% by mass, product of BASF, light stabilizer)
Acrylic resin emulsion (NEOCRYL A6015, solid content of 45% by mass, product of Kusumoto Chemicals, Ltd.)
Polyether-based urethane resin emulsion (WBR-061U, solid content of 25% by mass, product of Taisei Fine Chemical Co., Ltd.)
Surfactant: $CH_3(CH_2)_{12}O(CH_2CH_2O)_3CH_2COONa$ (product of Nikko Chemicals Co., Ltd., NIKKOL ECTD-3NEX)
Polyethylene wax (AQUACER-515, product of BYK Japan K.K.)
Levelling agent: polyether-modified polydimethylsiloxane (BYK-333, product of BYK Japan K.K.)
Aspects of the present invention are, for example, as follows.

<1> An inkjet ink, including:
water;
a water-soluble organic solvent;
a pigment;
polycarbonate-modified urethane resin particles;
an ultraviolet absorber; and
a light stabilizer.
<2> The inkjet ink according to <1>, wherein the pigment is a white pigment.
<3> The inkjet ink according to <1> or <2>, wherein a mass ratio (A/B) of the ultraviolet absorber (A) to the light stabilizer (B) is from 1/0.1 to 1/2.
<4> The inkjet ink according to any one of <1> to <3>, wherein an amount of the ultraviolet absorber is from 0.05% by mass to 1% by mass, and an amount of the light stabilizer is from 0.05% by mass to 1% by mass.
<5> The inkjet ink according to any one of <1> to <4>, wherein each of the ultraviolet absorber and the light stabilizer is contained in water-insoluble acrylic polymer particles in the form of water dispersion.
<6> The inkjet ink according to any one of <1> to <5>, wherein an amount of the polycarbonate-modified urethane resin particles is from 0.5% by mass to 10% by mass.
<7> The inkjet ink according to any one of <1> to <6>, wherein the water-soluble organic solvent includes a water-soluble organic solvent having a boiling point of 220° C. or lower.
<8> The inkjet ink according to any one of <1> to <7>, wherein the water-soluble organic solvent includes propylene glycol, 1,3-propanediol, 1,2-butanediol, 1,3-butanediol or 2,3-butanediol, or any combination thereof.

<9> The inkjet ink according to any one of <1> to <8>, further including a polyethylene wax.

<10> The inkjet ink according to any one of <1> to <9>, further including a levelling agent, and the levelling agent is polyether-modified polydimethylsiloxane.

<11> An ink cartridge, including:
the inkjet ink according to any one of <1> to <10>; and
a container, in which the inkjet ink is housed.

<12> An inkjet recording device, including:
an ink jetting unit configured to apply a stimulus to the inkjet ink according to any one of <1> to <10> to allow the inkjet ink to jet, to thereby record an image on a recording medium; and
a heating unit configured to heat the recording medium on which the image has been recorded.

<13> The inkjet recording device according to <12>, wherein the recording medium is a non-porous base material.

<14> An inkjet recording method, including:
applying a stimulus to the inkjet ink according to any one of <1> to <10> to allow the inkjet ink to jet, to thereby record an image on a recording medium; and
heating the recording medium on which the image has been recorded.

<15> The inkjet recording method according to <14>, wherein the recording medium is a non-porous base material.

This application claims priority to Japanese application No. 2013-238755, filed on Nov. 19, 2013, Japanese application No. 2014-109635, filed on May 28, 2014 and Japanese application No. 2014-213549, filed on Oct. 20, 2014 and incorporated herein by reference.

What is claimed is:

1. An inkjet ink, comprising:
water;
a water-soluble organic solvent;
a pigment;
polycarbonate-modified urethane resin particles;
an ultraviolet absorber; and
a light stabilizer,
wherein each of the ultraviolet absorber and the light stabilizer is contained in water-insoluble acrylic polymer particles.

2. The inkjet ink according to claim 1, wherein the pigment is a white pigment.

3. The inkjet ink according to claim 1, wherein a mass ratio (A/B) of the ultraviolet absorber (A) to the light stabilizer (B) is from 1/0.1 to 1/2.

4. The inkjet ink according to claim 1, wherein an amount of the ultraviolet absorber is from 0.05% by mass to 1% by mass, and an amount of the light stabilizer is from 0.05% by mass to 1% by mass.

5. The inkjet ink according to claim 1, wherein an amount of the polycarbonate-modified urethane resin particles is from 0.5% by mass to 10% by mass.

6. The inkjet ink according to claim 1, wherein the water-soluble organic solvent comprises a water-soluble organic solvent having a boiling point of 220° C. or lower.

7. The inkjet ink according to claim 1, wherein the water-soluble organic solvent comprises propylene glycol, 1,3-propanediol, 1,2-butanediol, 1,3-butanediol or 2,3-butanediol, or any combination thereof.

8. The inkjet ink according to claim 1, further comprising a polyethylene wax.

9. The inkjet ink according to claim 1, further comprising a levelling agent, wherein the levelling agent is polyether-modified polydimethylsiloxane.

10. An ink cartridge, comprising:
an inkjet ink; and
a container, in which the inkjet ink is housed,
wherein the inkjet ink comprises: water; a water-soluble organic solvent; a pigment; polycarbonate-modified urethane resin particles; an ultraviolet absorber; and a light stabilizer, and
wherein each of the ultraviolet absorber and the light stabilizer is contained in water-insoluble acrylic polymer particles.

11. An inkjet recording device, comprising:
an ink jetting unit configured to apply a stimulus to an inkjet ink to allow the inkjet ink to jet, to thereby record an image on a recording medium; and
a heating unit configured to heat the recording medium on which the image has been recorded,
wherein the inkjet ink comprises: water; a water-soluble organic solvent; a pigment; polycarbonate-modified urethane resin particles; an ultraviolet absorber; and a light stabilizer,
wherein each of the ultraviolet absorber and the light stabilizer is contained in water-insoluble acrylic polymer particles.

12. The inkjet recording device according to claim 11, wherein the recording medium is a non-porous base material.

* * * * *